(12) United States Patent
Vanstory et al.

(10) Patent No.: US 6,732,028 B2
(45) Date of Patent: May 4, 2004

(54) NETWORK BASED AUTOMOTIVE SERVICE MONITORING SYSTEM

(75) Inventors: Randy Vanstory, New Braunfels, TX (US); Lynn B. Graham, The Woodlands, TX (US); Richard Davis, Tomball, TX (US)

(73) Assignee: Joe Auto, Inc., Tomball, TX (US)

( * ) Notice: Subject to any disclaimer, the term of this patent is extended or adjusted under 35 U.S.C. 154(b) by 0 days.

(21) Appl. No.: 09/784,603

(22) Filed: Feb. 15, 2001

(65) Prior Publication Data

US 2002/0111727 A1 Aug. 15, 2002

(51) Int. Cl.$^7$ ................................................ G06F 7/00
(52) U.S. Cl. ........................................ 701/33; 701/29
(58) Field of Search ............................. 701/29, 33, 35; 73/117.2, 117.3

(56) References Cited

U.S. PATENT DOCUMENTS

| | | | |
|---|---|---|---|
| 5,657,233 A | | 8/1997 | Cherrington et al. .... 364/464.1 |
| 5,717,595 A | | 2/1998 | Cherrington et al. .... 364/464.1 |
| 5,916,287 A | * | 6/1999 | Arjomand et al. ............ 701/29 |
| 6,070,155 A | | 5/2000 | Cherrington et al. ........ 705/400 |
| 6,263,322 B1 | * | 7/2001 | Kirkevold et al. .......... 705/400 |
| 6,311,214 B1 | * | 10/2001 | Rhoads ....................... 709/217 |
| 6,405,111 B2 | * | 6/2002 | Rogers et al. ................. 701/33 |

\* cited by examiner

*Primary Examiner*—Yonel Beaulieu
(74) *Attorney, Agent, or Firm*—Gardere Wynne Sewell, LLP

(57) ABSTRACT

A network based automotive service monitoring system having one or more video transmission devices, the video transmission devices being positioned within one or more service bays to allow viewing of the service event. The system may include one or more user computers operated by the one or more users and one or more network servers, the network servers in communication with the one or more user computers, the network server being configured to relay video transmissions of the service event from the one or more video transmission devices to the one or more user computers via a communications network.

13 Claims, 35 Drawing Sheets

*— 900*

| Corporate Identity (Logo & Promise) | Home ① | To locate a Company Service Center near you. Please enter your five digit Zip code [ ] Locate | Toll free 1.877.0000000 (1.877.000.0000) or contact Live Help |

Arrange Service

③   Step ① 2  3  4  5  6  Start
904 ⤴

Text to communicate a question to the consumer for the purpose of proposing the question "Tell us where you are?" or "Where will you be?" or " Are we near either of those choices?" and why we are asking.

906 ⤵ PLEASE NOTE: It is not necessary to make an appointment to bring your car in for service, but it will...

⑤ Choose From One of the Following:

⑥ I want to try this online thing and arrange to have Company Pick up my car.
908 ⤴ What is the zip code where your vehicle is located...?("We need to make sure you are within our service area...")

[    ] [Start]

910 ⤵ There is no extra charge for pick up unless your vehicle requires towing.

⑦ I want to try this online thing, but prefer to drive my car to Company.
What is the zip code where you are located...?("We need to know to which location to direct you...")

912 ⤵ [    ] [Start]

⑧ Just call me, I'll tell you everything then.
Where can we call you?
[  ][  ][    ]
What Time? [    ]
Your Name? [    ] [Start]

914 ⤵
⑨ Need Help? Contact our customer care center at 1.877.0000000 (1.877.000.0000).

⑩ Need to modify/cancel an existing appointment?
*Please enter your TRANSACTION code into the box. This is the code you were issued when you originally scheduled an appointment. Don't have it? Call our Customer Support Center Toll free at 1.877.0000000 (1.877.000.0000)*

[          ] [Retrieve]

Commercial Accounts... ? ⑪
Click Here

902 ⤵
Registered Company users: ⑫
Name: [    ]
Pass: [    ]
Forgot your Password?
[Enter]

⑬
(Security Seal) [Security Seal]

*FIG. 8*

| Corporate Identity (Logo & Promise) | To locate a Company Service Center near you. Please enter your five digit Zip code [    ] Locate | Toll free 1.877.0000000 (1.877.000.0000) or contact Live Help |
|---|---|---|

Home ①

Arrange Service ③
Step 1 ② ③ 4 5 6   Your Vehicle Info...

920 — ④ Service Center Information
The location nearest you is [Location Name, Street Address, City, State, Zip, Tel Number].

Click here to go back and enter a different Zip code.

Note: This question only appears if the user requests drive in service.

922 — ⑤ I Would like to schedule service for...
[Make ▽]  [Model ▽]  [Year ▽]
○ I'm unsure of the specifics...

924 — ⑥ Is your car in safe drivable condition?
○ Yes - there is no charge to pick up or drop off...
○ No. I am willing to pay the $(market specific) towing fee.
○ Yes, but I would like it transported on a carrier anyway. I realize there is a $(market specific) towing fee.

Note: This question only appears if the user requests pick up service.

926 — ⑦ Would you like an Hourly Loaner Vehicle? Details
○ Yes
○ No

Please note: In order to qualify for an hourly rate loaner car, you must:
• be at least 21 years of age,
• have a valid credit card (American express, Visa, MasterCard, or Discover????)
• have a valid US drivers licence
• have mandatory liability coverage on the car, and
• be able to show your drivers licence and proof of insurance to Company staff.

⑧ Need help? Contact our customer care center at 1.877.00000000 (1.877.000.0000).

928 ⑨ [Previous]    930 ⑩ [Next]

| Corporate Identity (Logo & Promise) | Home ① | To locate a Company Service Center near you. Please enter your five digit Zip code [____] Locate | Toll free 1.877.0000000 (1.877.000.0000) or contact Live Help |

Arrange Service ③

Step 1  2  ③  4  5  6   *Tell us what's wrong...*

*936*      *934*

④ Use this area to tell us in your own words what is wrong or what you want done...<u>Click Here to use our Self Diagnostics tool.</u>

[                                                                    ]

*938*

⑤ Or if you prefer to choose from some common repair services or symptoms. Click the ADD button and follow the simple steps to select what..... You may ADD as many items as necessary.

| Edit | Del | Item 1 | Problem Area | Symptom | Details | $ (market 1 hr) |
|------|-----|--------|--------------|---------|---------|-----------------|
| Edit | Del | Item 2 | Problem Area | Symptom | Details | $ 0 |
| Edit | Del | Item 2 | Problem Area | Symptom | Details | $ 0 |

[ADD]

*940*

⑥ Would you like us to perform a FREE Bumper to Bumper inspection? We won't repair anything without letting you know first...<u>Details</u>

○ Yes
○ No

*942*

⑦ Need help? Contact our customer care center at 1.877.0000000 (1.877.000.0000).

*944*       *946*

⑧           ⑨

[Previous]  [Next]

| Corporate Identity (Logo & Promise) | Home ① | To locate a Company Service Center near you. Please enter your five digit Zip code [____] Locate | Toll free 1.877.0000000 (1.877.000.0000) or contact Live Help |

Arrange Service ③

Step   1   2   3   ④   5   6   What time...
        950 ⤴

*← 952*

④ Location

Times available for:[Location, name, Street address, City, State Zip, Tel Number].

Typically vehicles received by Company before 1:00 pm are returned the same day before 8:30 pm....

*← 954*

⑤ | 6:30 am
  |
  | states to reflect available, some available (select soon), not available
  |
  | 1:00 pm

*Same day*

*← 956*

| 1:30 pm
  |
  | select a TIME will advance this screen
  |
  | 8:30 pm

*OverNite*

⑥ Need help? Contact our customer care center at 1.877.0000000 (1.877.000.0000).

958 ⤵ ⑦          ⑧ *← 960*
      [Previous]   [Next]

*FIG. 11*

| Corporate Identity (Logo & Promise) | | Toll free 1.877.0000000 (1.877.000.0000) or contact Live Help |
|---|---|---|
| Home ① | To locate a Company Service Center near you. Please enter your five digit Zip code ____ Locate | |

Arrange Service ③

Step 1  2  3  4 ⑤  6  Your Information...
                964

Tell us about yourself...Me? I'm A Gemini with a full moon rising;-)

966 — ④ Salutation [▽]  First name [____]  Last Name [____]

968 — ⑤ Where can we call you during repairs? Primary [____]
       e-Mail [____]                         Alternate [____]

970 — ⑥ Would you like a loaner mobile phone at no extra charge so that we may contact...? Details
       ○ Yes
       ○ No ⑦ Uh...where are we going?
   Where are we picking up your vehicle? — 972

[____] Street Address
   [____] Street Address Continued
          City, State ZIP Note: This question only appear if the user requests pick up service.

974 — ⑧ If you anticipate having your vehicle returned to a different address than the one we are picking up from, you may wish to click here to check that the address is within our Car Return area.

976 — ⑨ Any Special Instructions?

[____]

⑥ Need help? Contact our customer care center at 1.877.0000000 (1.877.000.0000).
              978 —                                                    — 980
                   ⑩ [Previous]  ⑪ [Next]

| Corporate Identity (Logo & Promise) | Home ① | To locate a Company Service Center near you. Please enter your five digit Zip code [ ] Locate | Toll free 1.877.0000000 (1.877.000.0000) or contact Live Help |
|---|---|---|---|

Arrange Service ③ *— 984*

986 — Step  1  2  3  4  5  ⑥ Summary

| | | | |
|---|---|---|---|
| ④ 988 — | Contact information: (Name & Tel...) | (title)(first name)(last name) (primary tel), (secondary tel), (e-mail) | 1001 — Edit |
| ⑤ 990 — | Scheduled (DRIVE IN/ PICK UP) service for: | (year)(make)(model) | 1001 — Edit 1001 — |
| ⑥ | From this address: | (street address)(street address line 2), (city)(state)(zip) | Edit |
| ⑦ 992 — | At this time: | (scheduled time) | Edit |
| ⑧ | At our (STORE NAME) Service Center: | (street address), (street address line 2),(city)(state)(zip) Edit NOTE: Directions are accessible from the following screen. | |
| 994 — ⑨ 996 — | To do this: | (Service Item 1)      (Known dollar amount) (Service Item 2)      (Known dollar amount) (Service Item 3)      (Known dollar amount)  Sub total                (subtotal) Taxes (tax rate)       (tax amount) Total                       (total) | |
| ⑩ | Keep-In-Touch Communications (wireless phone). ○ Yes ○ No — 998 | | |
| ⑪ | Hourly rate loaner vehicle. ○ Yes ○ No — 1000 In order to qualify for an hourly rate loaner car, you must: be at least 21 years of age, have a valid US drivers licence have mandatory liability coverage on the car, and be able to show your drivers licence and proof of insurance to Company staff | | |

⑬ Need help? Contact our customer care center at 1.877.0000000 (1.877.000.0000).

1002 — ⑭   1004 — ⑮         ⑯  — 1006
   [Previous]   [Confirm this Appt]   [Cancel]

| Corporate Identity (Logo & Promise) | Home ① | To locate a Company Service Center near you. Please enter your five digit Zip code [ ] Locate | Toll free 1.877.0000000 (1.877.000.0000) or contact Live Help |

1010 —
Appointment Confirmation ③

Transaction Code... *(transaction #)*
IMPORTANT:

④ [ View/ Print Details ] /— 1012

1014 —

⑤ Click here if you wish to fill out the Loaner Vehicle form online. This may also be done at the time of delivery.
[Only appears if Loaner Vehicle is requested.]

⑥ Registration /— 1016
To save you time on your next text visit and remember some of your preferences such as vehicle information, address (depends on completed fields), provide us with a user name and password so that we may identify you at a later time. THIS IS NOT REQUIRED TO COMPLETE SCHEDULING OF YOUR SERVICE, BUT WILL SAVE YOU CONSIDERABLE TIME WHEN YOU RETURN TO CHECK STATUS OR SCHEDULE SERVICE AT ANOTHER TIME.

User ID: [ ] /— 1018
Pass: [ ] /— 1020
Re-enter your password: [ ] /— 1022
[ Register ] /— 1024

/— 1026
⑦ Need to view a map or get directions? Click Here to use Map...

⑧ Need help? Contact our customer care center at 1.877.0000000 (1.877.000.0000).

1028 —      ⑨           ⑩ /— 1030
[ Arrange Service for an Additional Vehicle ]   [ Home ]

| Corporate Identity (Logo & Promise) ① | |
|---|---|
| ⑫ Appointment Confirmation ② — 1034 Transaction Code... (transaction #) | |
| ③ Contact Information: (Name & Tel...) | (title)(first name)(last name) (primary tel), (secondary tel), (e-mail) |
| ④ Scheduled (DRIVE IN/ PICK UP) service for: | (year)(make)(model) |
| ⑤ From this address: | (street address)(street address line 2), (city)(state)(zip) |
| ⑥ At this time: | (scheduled time) |
| ⑦ At our (STORE NAME) Service Center: | (street address), (street address line 2),(city)(state)(zip) NOTE: Directions are accessible from the following screen. |
| ⑧ To do this: | (Service Item 1) (Known dollar amount) (Service Item 2) (Known dollar amount) (Service Item 3) (Known dollar amount) Sub total (subtotal) Taxes (tax rate) (tax amount) Total (total) |
| ⑨ Keep-In-Touch Communications (wireless phone). ○ Yes ○ No | |
| ⑩ Hourly rate loaner vehicle. ○ Yes ○ No In order to qualify for an hourly rate loaner car, you must: be at least 21 years of age, have a valid US drivers licence have mandatory liability coverage on the car, and be able to show your drivers licence and proof of insurance to Company staff | |

1036
1038
1040
1042
1044
1046
1048
1050

⑬ [Print This Page] 1052
⑭ [Close Window] 1054

Directions:
From (Interstate):
From (Interstate):
From (Interstate):

┌─────────────────────────────────────────────────────────────────────────┐
│ Corporate Identity | Home | To locate a Company Service | Toll free 1.877.0000000 │
│ (Logo & Promise) | ① | Center near you. Please enter your five | (1.877.000.0000) or │
│ | | digit Zip code [____] Locate | contact Live Help │
├─────────────────────────────────────────────────────────────────────────┤

Arrange Service ③

Step ① 2 3 4 5 6 Your Information...

1114 — Descriptive text about this page...

④ Who is responsible today.....? (contact info) - please select one.   1144 —[ New ]

1116 — Title  First Name  Last Name
1118 — ○ (title) (first name) (last name)(email_address@url.com)  edit  del
       ○ (title) (first name) (last name)(email_address@url.com)  edit  del
       Primary Tel   Alternate Tel        Want us to just call you instead?
1120 — [-select- ▽] [-select- ▽]  edit list   [ Yeah, just call me... ] — 1124
                                                                    1146 —[ New ]
⑤ Would you like a loaner mobile phone at no extra charge so that we may
   contact...? Details
1126  ○ Yes  ○ No ⑥ Which vehicle are we looking at.....? please select one (you may schedule
   service for a second vehicle.....).
1128      Make  Model  Year
1130 — ○ (make)(model)(year) *              edit del   View History
1132 — ○ (make)(model)(year) *              edit del   View History
1134 — ○ I'm unsure of the specifics...
       *Denotes vehicles currently scheduled for service. Details  1148 —[ New ]
⑧ Where is your vehicle at.....? — 1136

Pick Up  Drive In  Street Address     City    State   Zip
          ○       ○       (Street Address 1,2) (city) (state) (Zip)  edit  del
1138 —            ○       (Street Address 1,2) (city) (state) (Zip)  edit  del ⑨ Special Instructions?

[                                                                        ]
[                                                                        ]
[                                                                        ]

⑩ If you anticipate having your vehicle returned to a different address than the one we are
   picking it up from, you may wish to click here to check that the address is within our Car
   Pick Up & Return area. — 1140

⑪ Need help? Contact our customer care center at 1.877.0000000 (1.877.000.0000).

1142
                        ⑫ [ Next ]

*FIG. 17*

*Corporate Identity*
*(Logo & Promise)*

Call Toll free 1.877.0000000
(1.877.000.0000) or *Live Help*

② New contact person...
Copy needed?

Salutation [▽] ─1152
 ─First name─ 1154 ─Last Name─ 1156
 ─ Primary ─ 1158
 ─ Alternate ─ 1160

④ Where can we call you during repairs?
e-Mail ─1162

─1164

⑤ ☐ Check here if you would like this contact to be the default primary contact

1166 ─⑥ [cancel]   ⑦ [ADD] ─1168

Corporate Identity
(Logo & Promise)

Call Toll free 1.877.0000000
(1.877.000.0000) or Live Help

①

② New vehicle...

③ Make [▽] 1172    Model [▽] 1174    Year [▽] 1176

④ ☐ Check here if you would like this vehicle to be the default primary vehicle. 1178

1180 ⑥ [cancel]    ⑦ [ADD] 1182

Corporate Identity
(Logo & Promise)

Call Toll free 1.877.0000000
(1.877.000.0000) or Live Help

② New address...

③ ZIP — 1186

Street Address — 1188
Street Address Continued — 1190

City, State ZIP

— 1191

⑤ ☐ Check here if you would like this address to be the default primary address.

1192 — ⑥ cancel    ⑦ Verify    ⑧ ADD
                   1194        1196

| Corporate Identity (Logo & Promise) | Home ① | To locate a Company Service Center near you, Please enter your five digit Zip code ___ Locate | Toll free 1.877.0000000 (1.877.000.0000) or contact Live Help |

Arrange Service ③
Step 1 ② 3 4 5 6  So what's wrong...

1238 — ④ Is your car in safe drivable condition?
  ○ Yes – there is no charge to pick up or drop off....
  ○ No.  I am willing to pay the $(market specific) towing fee.
  ○ Yes, but I would like it transported on a carrier anyway.  I realize there is a $(market specific) towing fee.

Note: This question only appears if the user requests pick up service.

1240 — ⑤ Would you like an Hourly Loaner Vehicle? Details
  ○ Yes  ○ No
  Please note: In order to qualify for an hourly rate loaner car, you must:
   • be at least 21 years of age,
   • have a valid credit card (American express, Visa, MasterCard, or Discover????)
   • have a valid US drivers licence
   • have mandatory liability coverage on the car, and
   • be able to show your drivers licence and proof of Insurance to Company staff.

1242 — ⑥ What can we do for you?
  □ Please just come and pick up my car, I know you'll have to call me, but I can't deal with this right now.

Note: This question only appears if the user requests pick up service.

1244 — ⑦ □ I think it's time for stuff.  Just take it & let me know what the manufacturer recommends.

1246 — ⑧ □ Or you may use this area to tell us in your own words what is wrong or what you want done...Click Here to use our Self Diagnostics tool.

⑧ Or if you prefer to choose from some common repair services or symptoms.  Click the ADD button and follow the simple steps to select what....  You may ADD as many items as necessary.

| Edit | Del | Item 1 | Problem Area | Symptom | Details | $ (market 1 hr) | ADD |—1247
| Edit | Del | Item 2 | Problem Area | Symptom | Details | $ 0 |

1248 — ⑨ Would you like us to perform a FREE Bumper to Bumper inspection?  We won't repair anything without letting you know first...Details
  ○ Yes  ○ No
  □ Repairs pre-approved up to the following amount: $ [000]  Save/Change —1249
  ⑩ Need help?  Contact our customer care center at 1.877.0000000 (1.877.000.0000).

1250 — ⑪ Previous    ⑫ Next —1252

← 1234

*1254*

| Corporate Identity (Logo & Promise) | Home ① | To locate a Company Service Center near you. Please enter your five digit Zip code [____] Locate | Toll free 1.877.0000000 (1.877.000.0000) or contact Live Help |

Arrange Service ③

Step 1 2 ③ 4   Select an appointment time...
*1256*

④ Location   *1258*

Times available for:[Location, name, Street address, City, State Zip, Tel Number].

Typically vehicles received by Company before 1:00 pm are returned the same day before 8:30 pm....

⑤
*1260*

| 6:30 am |
| states to reflect available, some available (select soon), not available |
| 1:00 pm |

*Same day*

*1262*

| 1:30 pm |
| select a TIME will advance this screen |
| 8:30 pm |

*OverNite*

⑥ Need help? Contact our customer care center at 1.877.0000000 (1.877.000.0000).

1264 — ⑦ [Previous]   ⑧ 1266 [Next]

| Corporate Identity (Logo & Promise) | Home ① | To locate a Company Service Center near you. Please enter your five digit Zip code [____] Locate | Toll free 1.877.0000000 (1.877.000.0000) or contact Live Help |

Arrange Service ③ — 1270
Step   1   2   3   ④   Summary Page

| | | |
|---|---|---|
| ④ 1274 | Contact information: (Name & Tel...) 1272 | (title)(first name)(last name) (primary tel), (secondary tel), (e-mail) (Edit) |
| ⑤ | Scheduled (DRIVE IN/ PICK UP) service for: | (year)(make)(model) (Edit) |
| ⑥ 1276 | From this address: | (street address)(street address line 2), (city)(state)(zip) (Edit) |
| ⑦ | At this time: 1278 | (scheduled time) (Edit) |
| ⑧ | At our (STORE NAME) Service Center: 1280 | (street address), (street address line 2),(city)(state)(zip)(Edit) NOTE: Directions are accessible from the following screen. |
| ⑨ | To do this: 1282 | (Service Item 1) (Known dollar amount) (Edit) (Service Item 2) (Known dollar amount) (Service Item 3) (Known dollar amount) Sub total (subtotal) Taxes (tax rate) (tax amount) Total (total) |
| ⑩ ⑪ | Keep-In-Touch Communications (wireless phone). ○Yes ○No — 1284 Hourly rate loaner vehicle. ○Yes ○No — 1286 In order to qualify for an hourly rate loaner car, you must: be at least 21 years of age, have a valid US drivers licence have mandatory liability coverage on the car, and be able to show your drivers licence and proof of insurance to Company staff | |

⑬ Need help? Contact our customer care center at 1.877.0000000 (1.877.000.0000).

1288 ⑭         ⑮ 1290   ⑯ 1292
(Previous)   (Confirm this Appt)   (Cancel)

*FIG. 23*

```
                                                    ┌─ 1300
                                                   ✦
┌─────────────────────┬──────────────────────────────┬──────────────────────┐
│ Corporate Identity  │ To locate a Company Service  │ Toll free 1.877.0000000│
│ (Logo & Promise)    │ Home │ Center near you. Please enter your five │ (1.877.000.0000) or │
│                     │  ①   │ digit Zip code [____] Locate            │ contact Live Help   │
├─────────────────────┴──────┴─────────────────────────────────────────────┤
│                          ┌─ 1302                                         │
│   Appointment Confirmation ③                                            │
│   Transaction Code... (transaction #)                                    │
│                                                      ┌─ 1304             │
│              ④ ┌──────── View/ Print Details ────────┐                   │
│                └──────────────────────────────────────┘   ┌─ 1306        │
│   ┌──────────────────────────────────────────────────────────────────┐   │
│ ⑤ │ Click here if you wish to fill out the Loaner Vehicle form online. This may also be done │
│   │ at the time of delivery.                                         │   │
│   │                          [Only appears if Loaner Vehicle is requested.] │
│   └──────────────────────────────────────────────────────────────────┘   │
│                                                                          │
│  ⑥ Need to view a map or get directions? Click Here to use Map...        │
│                                                                          │
│      1308 ─┐             ⑦                    ⑧ ┌─ 1310                  │
│            ┌──────────────────────────────────┐  ┌──────┐                │
│            │ Arrange Service for an Additional Vehicle │  │ Home │       │
│            └──────────────────────────────────┘  └──────┘                │
└──────────────────────────────────────────────────────────────────────────┘
```

*FIG. 24*

Corporate Identity
(Logo & Promise)

Call Toll free 1.877.0000000
(1.877.000.0000) or
contact Live Help ◀— 1405

① ② Vehicle: (year) (make) (model) ◀— 1415

③ Problem Area ◀— 1410   ④ Detail 1... ◀— 1415   ⑤ Conditions... ◀— 1420

General Services
Steering
Starting
Symptom...
Symptom...
Symptom...
Symptom...
Symptom...

Won't Start
Slow to Start
Makes Grinding Noise
Detail...
Detail...
Detail...
Detail...
Detail...

Always
Sometimes
Mornings
Condition...
Condition...
Condition...

NOTE: For service other than "GENERAL SERVICE" items, a $(market rate) diagnostic will be charged. ⑥
This fee is applied towards service...

⑦ $ [000.00] + $ [000.00] = $ [000.00] + $ [000.00] = $ [000.00]
   parts      labor      sub total     tax (market %)   total
1425 —      1430 —                    1435 —

⑧ [cancel] [ADD] ⑨

*Corporate Identity*
*(Logo & Promise)*

Home

To locate a Company Service Center near you. Please enter your five digit Zip code [ ] Locate Toll free 1.877.0000000 (1.877.000.0000) or contact Live Help Arrange Service Now — 2070

What Do You Want To Know? — 2005
OVERVIEW: Company
- *The Choice Is Yours*
- Performance Stats
- Take A Virtual Tour
- Compare Our Prices
- Policy: Additional Repairs Needed
- $50 Cash or $50 Off Your Bill
- Let's Do Business — 2025
- Self Diagnosis/Estimate
- Arrange Service
- Watch It happen Live
- Watch Your Repair LIVE on the Internet
- How Far Along Are We?
- But Wait, There's More
- Your Service History with Company
- Automotive Resource Library
- Add/Edit Vehicles
- Edit Personal Info

Personal Info...
Descriptive copy if necessary

PEOPLE INFO:
Title  First Name  Last Name  e-Mail Address — 2010
(title) (first name) (last name) (email_address@url.com)  edit  del — 2035
(title) (first name) (last name) (email_address@url.com)  edit  del Service Prefs — 2065    Edit Vehicles — 2020
                                    New — 2040
The Person displayed [Red, bold, ???] is your primary Contact. To change your primary Person, click the view edit button for the Person you wish to select.

Telephone #'s — 2030 / 2035
(###-###-####)  edit  del
(###-###-####)  edit  del
                                    New — 2055

ADDRESS INFO: — 2045
Available
Pick Up  Drive In  Street Address  City   State   Zip
Y         Y       (Street Address 1,2)  (city) (state) (Zip)  edit  del — 2060
N         Y       (Street Address 1,2)  (city) (state) (Zip)  edit  del
                                    New — 2050
The Address displayed [Red, bold, ???] is your primary Address. To change your primary Adress, click the view edit button for the Address you wish to select.
If you have questions or comcerns, please call us Toll free 1.877.0000000 (000.0000)
[I'm done, take me home...] — 2075

[This only appears if the user has entered a transaction code to access this page instead of a Name & Password.]

View/Edit Personal Info...
Enter another Transaction code to view Personal Information for that Transaction:
[ ]  [View] — 2080

Registration
To allow more than one person or...... provide us with a user name and password so that we may set up an account. THIS IS NOT REQUIRED, BUT WILL... — 2085

User ID: [ ]
Pass: [ ]
Re-enter your password: [ ]

[Register]  — 2000

NETWORK BASED AUTOMOTIVE SERVICE MONITORING SYSTEM

TECHNICAL FIELD OF THE INVENTION

The present invention relates generally to the automotive repair services and more particularly to a network based automotive service monitoring system.

BACKGROUND

Automotive repairs can tend to be some of the most troubling and schedule disturbing events that a person in today's society must endure. People need to find a mechanic they can trust. They must try to find a price that is acceptable for the work to be performed. They must arrange to have their vehicle either taken to the service facility or must arrange time out of their day to take the vehicle to the service provider themselves.

No matter how much advance planning is involved, automotive repairs can be hassle. Additionally, once a person has a scheduled repair, the person may have to be concerned with the work quality being performed on the vehicle. Many consumer would ideally like to able to watch their repair work as it is ongoing, to assure honesty and timeliness. Moreover, many people would like to have their repairs performed on the same day or overnight.

Because scheduling has become a hassle for both automotive repair facilities and customers, people are seeking easier methods of scheduling automotive repairs. Additionally, because the labor cost involved in automotive repairs tend to be high, consumers are scrutinizing more and more the labor being performed. Therefore, a need has arisen for more efficient scheduling and quality control within the automotive repair industry.

SUMMARY OF THE INVENTION

The present invention provides for a network based automotive service monitoring system. The network based monitoring system may include one or more service bays at a service facility, each service bay having a service event. The system may also include one or more video transmission devices, the video transmission devices being positioned within one or more service bays to allow viewing of the service event. Additionally, the system may include one or more user computers operated by the one or more users. The system may further include one or more network servers, the network servers in communication with the one or more user computers, the network server being configured to relay video transmissions of the service event from the one or more video transmission devices to the one or more user computers via a communications network.

The present invention may also provide for a network based automotive service monitoring system having one or more video transmission devices, the video transmission devices being positioned within one or more service bays to allow viewing of the service event. The system may include one or more user computers operated by the one or more users and one or more network servers, the network servers in communication with the one or more user computers, the network server being configured to relay video transmissions of the service event from the one or more video transmission devices to the one or more user computers via a communications network.

The present invention may further include a method of monitoring automotive service via a communication network. The method may include the steps of associating a service event with a user, receiving from the user to view the service event, activating a video transmission device positioned to monitor the service event, and transmitting video transmissions from the video transmission device to the user via the communications network.

Additionally, the present invention may include a computer program to monitor automotive service via a communication network. The computer program may include a code segment to associate a service event with a user. The computer program may also include a code segment to receive a request from the user to view the service event. The computer program may further include a code segment to activate a video transmission device positioned to monitor the service event. The computer program may include a code segment to transmit video transmissions from the video transmission device to the user via the communications network.

BRIEF DESCRIPTION OF THE DRAWINGS

For a more complete understanding of the features and advantages of the present invention, reference is now made to the detailed description of the invention along with the accompanying figures in which the corresponding numerals and the different figures refer to corresponding parts and in which:

FIG. 8 is a screen shot showing the arranged service component of the present invention;

FIG. 9 is a screen shot showing the second step of the arranged service process of the arranged service component;

FIG. 10 is a screen shot showing the third step in the arranged service process of the arranged service component;

FIG. 11 is a screen shot showing the fourth step in the arranged service process of the arranged service component;

FIG. 12 is a screen shot showing the fifth step in the arranged service process of the arranged service component;

FIG. 13 is a screen shot showing the summary page in the arranged service process of the arranged service component;

FIG. 14 is a screen shot showing the confirmation page of the arranged service component;

FIG. 15 is another screen shot showing the confirmation page with a print function;

FIG. 17 shows the first step in the arranged service process for a registered user of the arranged service component;

FIG. 18 is a screen shot showing a new responsible person entry form;

FIG. 19 is a screen shot showing a new vehicle entry form of the arranged service component for a registered user;

FIG. 20 is a screen shot showing a new address entry form of the arranged service component for a registered user;

FIG. 21 is a screen shot showing the second step of the arranged service process for a registered user;

FIG. 22 is a screen shot showing the third step of the arranged service process for a registered user;

FIG. 23 is a screen shot showing the summary page of the arranged service process for a registered user;

FIG. 24 is a service event confirmation page for the arranged service process for a registered user;

FIG. 25 is a screen shot showing a pop-up window displayed for a user to enter problems or symptoms with a vehicle;

FIG. 31 is a screen shot showing the personal information edit screen of the present invention.

DETAILED DESCRIPTION OF THE INVENTION

Figure 1A:
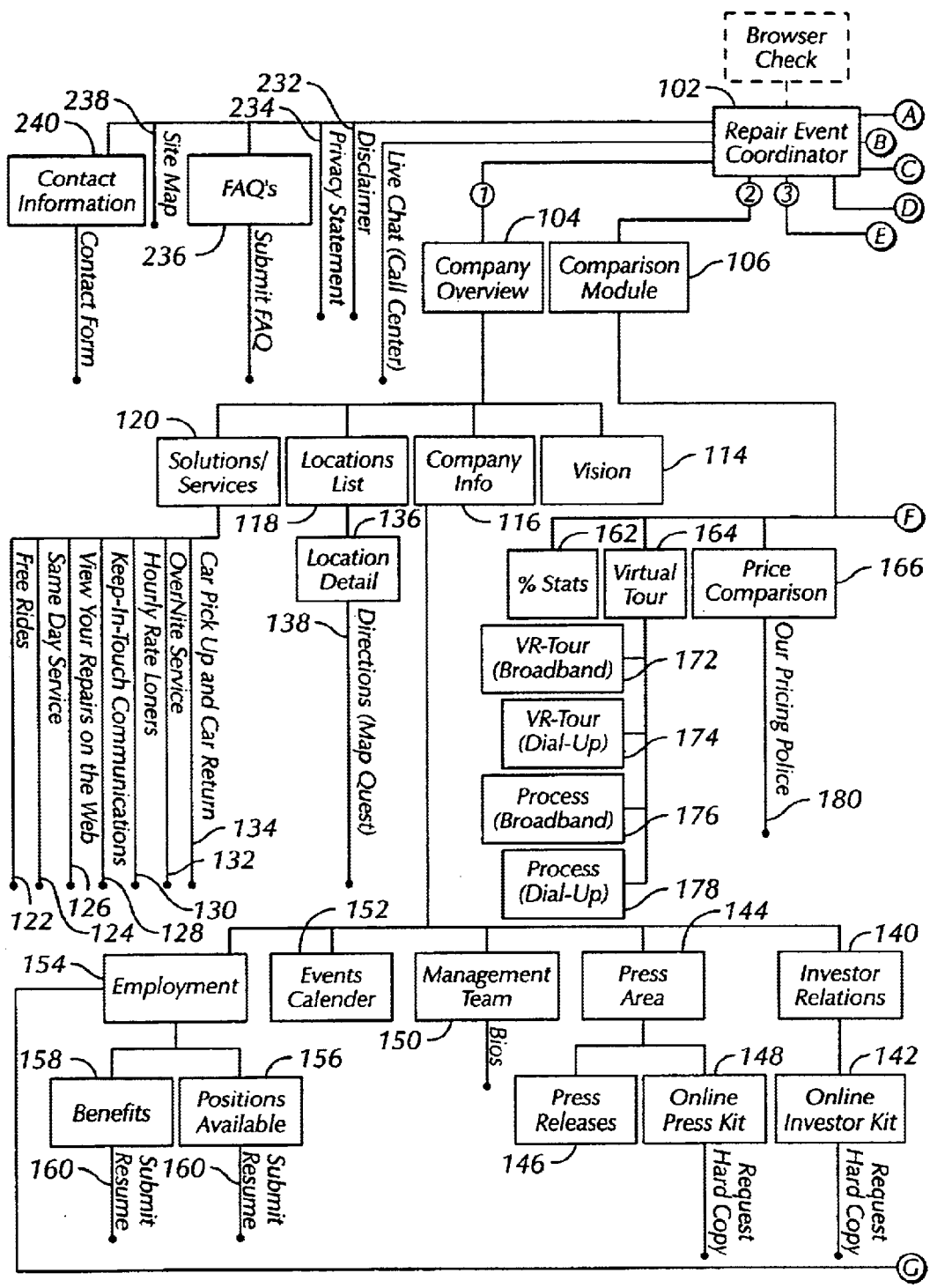
FIG. 1 is a block diagram showing a computerized automotive repair appointment and monitoring system.
Figure 1B:
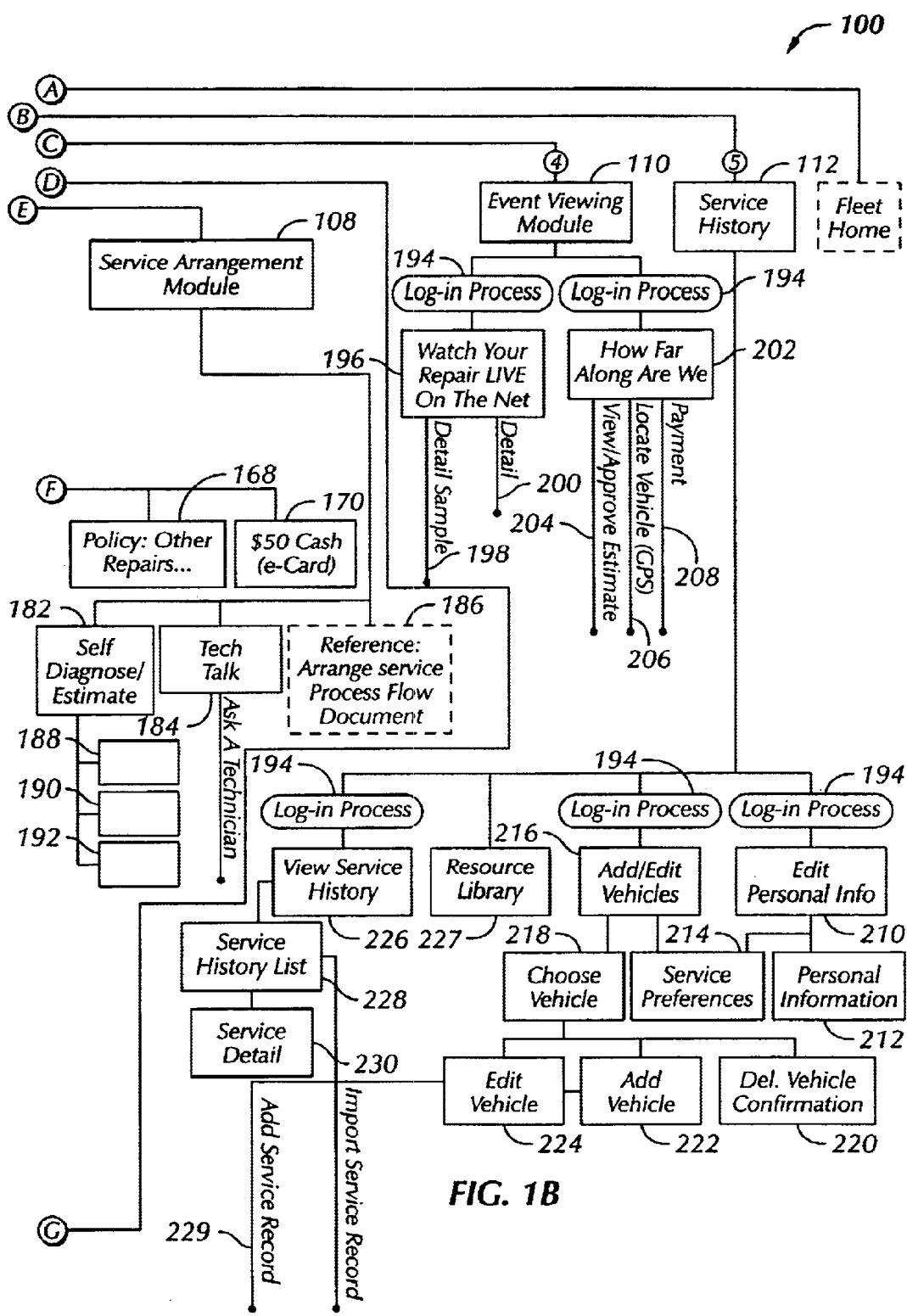

Referring to FIG. 1, a network based automotive service event scheduling and monitoring system of the present invention is generally depicted as 100. A service event coordinator of the present invention is generally shown by block 102. The service event coordinator 102 includes company overview module 104, a comparison module 106, a service arrangement module 108, a service event-viewing module 110, and a service history module 112.

The company overview module 104 may include four components. The company overview module 104 may contain a company vision component 114, a company information component 116, a location component 118 and a solution/service component 120. The solution/service component 120 enables the system to provide the user with various options for making service event convenient for the user. The options may include giving the user a free ride 122. The user may also choose to have the service event a same day service 124 or an overnight service event 132. The user may also choose to have the ability to view your repairs on the web 126. Additionally, the user may choose a keep-in-touch communications 128. The keep-in-touch communications 128 may include loaner cellular phones provided by the service provider to the user. Also, the user may choose to use hourly rate loaners 130 provided by the service provider. The user request, through the system that the vehicle to be serviced be picked up by the service provider and returned upon completion of the service event 134. All of these options can be displayed for the user on a user computer and allow the customer to select and arrange the various service options.

The locations list component 118 provides details to the user about the service facilities nearest the user 136. In turn, the user may be provided with directions and maps to the various service facilities. The maps and directions may be provided by an online service provider 138 specializing in online maps and directions, such as MapQuest®.

The company information component 116 provides the user with an overview of the service provider operating the repair facility and the online services. The company information component 116 may provide the user with investor relation information 140. The investor relation component 140 may include an online investor kit 142. The online investor kit 142 can enable the customer to invest in the service provider operating the online services and the associated service facilities.

The information component 116 may include a press area 144. The press area 144 allows the user to browse various press releases concerning the service provider 146 and provide the user with an online press kit 148. The company information component 116 may also include information concerning the management team 150 of the service provider. The management team information 150 provides the user with biographies of all the management team members for all the locations of the service provider.

The company information component 116 may include an events calendar 152. The events calendar 152 provides the user with special events and specials being promoted by the service provider. The events may be special deals on routine service work, repairs, or other similar special offers.

The company information component 116 may further include employment information 154. The employment information 154 may provide the customer with available employment position information 156 and benefits information 158. Both the available position information 156 and the benefits information 158 allow resume submission 160 by the user for review by the service provider.

The comparison module 106 of the repair event coordinator 102 includes a statistics component 162, a virtual tour component 164, a price comparison component 166, a policy component 168 and an e-cash component 170. The statistics component 162 allows the user to view and analyze statistics about the service provider and compare those statistics with other service providers. Additionally, the statistics component 162 allows the user to view statistics about the various service facilities. The virtual tour component 164 allows the user to take virtual tours of a repair facility and observe how the service provider conducts repairs, tends to clients, and the like. The virtual tours component 164 can display the virtual tours and processes in either broad-band as in 172 and 176 or through a dial up mode as in 174 and 178. The price comparison component 166 allows the user to compare the prices for repair services of the service provider with other service providers both in the same locale and nationwide. Additionally, the pricing comparison component 166 may allow the user to view the pricing policy of the service provider 180.

The service arrangement module 108 may include a self-diagnosis component 182, a technician chat component 184 and an arrange service component 186. The self-diagnosis component 182 allows the user to diagnose the problems associated with a particular vehicle. The self-diagnosis component 182 allows the user to select various descriptors for the problems associates with the vehicle. The user may generally select from three categories when describing the problems with the vehicle. The first category can be the problem area 188. The next category may be the detail area 190 and another area may be the condition area 192. All these areas allow the user to diagnose the problems with the vehicle to be repaired by stating specific symptoms the vehicle may be experiencing. While only three categories are specifically mentioned, it will be appreciated that one or more categories may be incorporated into the invention.

The technician chat component 184 allows the user to ask technicians questions with respect to a vehicle of the user or problems that vehicle may be experiencing. The arrange service component 186 allows the user to arrange service for the vehicle online. This component will be explained in further detail below.

The service event module 110 can comprise service event-viewing component 196 and a vehicle status component 202. Both components will be explained in further detail below, however, both components require a login process 194 to access the features. The login process 194 can consist of entering either a username and password or transaction code. The service event-viewing component 196 may allow the user to either view a demonstration repair project 198 or view the repair of the user's vehicle 200. The vehicle status component 202 may allow the user to view and approve estimates 204, locate their vehicle in the service process 206 and make payment for the repairs provided by the service provider 208.

The service history module 112 can comprise a service history-viewing component 226, a resource component 227, an add/edit vehicle component 216 and an edit personal information component 210. The edit personal information component 210 may include personal information of the users registered with the service provider or users having a service event performed by the service provider 212, and service preferences for the users 214. The edit personal information component 210 allows the users to change and update their personal information and service preferences. The add/edit vehicle component 216 may allow the user to edit service preferences of the user 214 or select vehicles to be added 222, edited 224, or deleted 220 from the service providers system 218. Once an edit has been made to the service history, a new service record 229 may be added to the service history 228.

The resource library 227 may allow the user to access different online resources for researching car maintenance. The view service history component 226 may allow the user to view the service history of the user 228 and receive service history details about vehicles of the user 230.

Figure 2A:
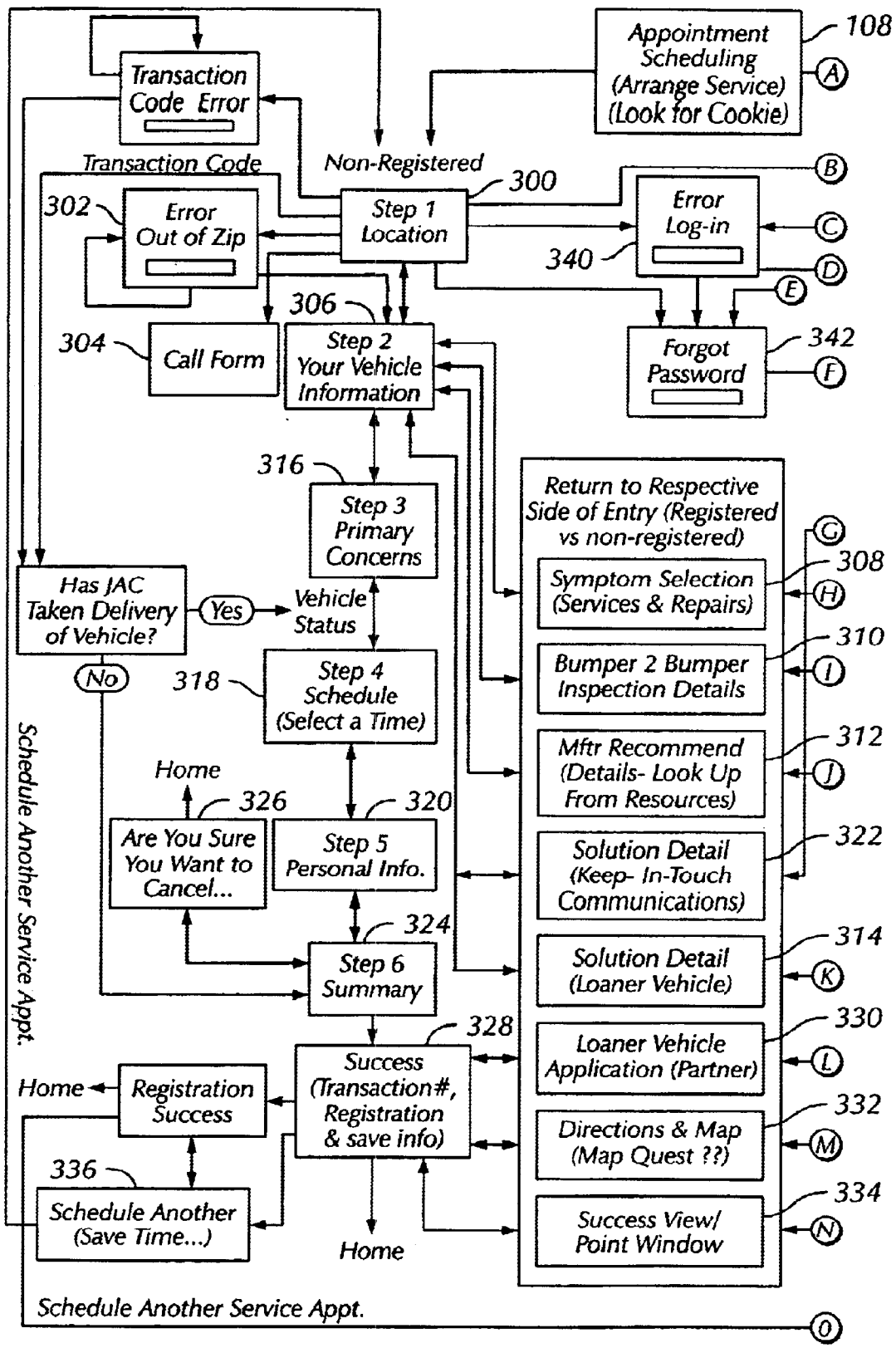
FIG. 2 is a block diagram showing a computerized service arrangement module of the present invention.
Figure 2B:
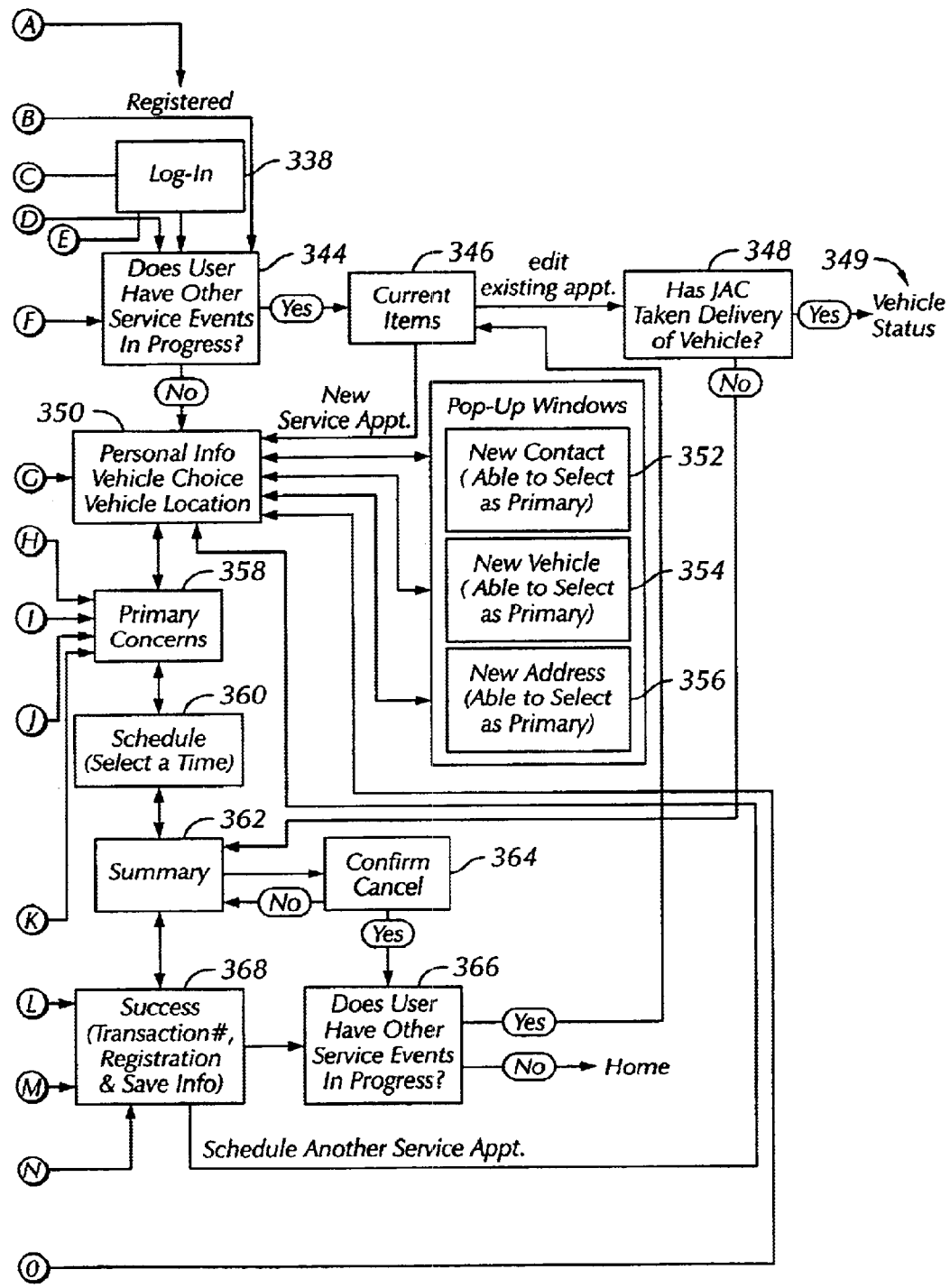

Referring now to FIG. 2, the arrange service process of the service arrangement module 108 of FIG. 1 is generally presented as a hierarchal flow diagram. The arrange service process arrangement functions of the service arrangement module have two categories: non-registered user arrange service process arrangements and registered user arrange service process. After a user enters the website of the service provider and chooses to schedule a service event, the user activates the service arrangement module 108. The service arrangement module 108 then attempts to determine if the user is a non-registered user or a registered user.

NON-REGISTERED USER ARRANGE SERVICE PROCESS

If the user is a nonregistered user, then the service arrangement module 108 determines the location of 300 the user. When determining the location 300 of the user, the service arrangement module 108 prompts the user to enter the zip code 302 for the location of the user. If the zip code 302 entered by the user is out of the service provider's area, an error message may be displayed to the user. The error message prompts the user to enter a different zip code. If however, the user enters a valid zip code, then the system prompts the user for the vehicle information 306.

As part of entering the vehicle information 306, the user may be asked to enter the symptoms 308 experienced by the vehicle. The user may also be asked to select a safety courtesy inspection inspection 310 for the vehicle. Additionally, the user may be asked if they want the manufacturer recommended service intervals for recommended preventive maintenance events 312. Also, the user may be asked to select a solution detail 314 for the user. The solution detail allows the user to select various options for service convenience as set forth above in reference to FIG. 1. After the vehicle information 306 has been entered, the user may be asked to enter the primary concerns 316 with respect to the vehicle.

Once the user has entered the primary concerns 316, then the user may be prompted to schedule the time of the appointment 318, including drop-off or pick-up time as appropriate. If the user has scheduled the time for drop-off or pick-up of the vehicle, then the user may be prompted to enter the personal information 320 of the user. Along with the personal information 320, the user may select a keep-in-touch communications option 322. The keep-in-touch communications option 322 allows for direct communication between the service provider and the user via a pager, cellular telephone, computer or other similar device.

After the user has entered the personal information 320, the system provides the user with a summary 324 of the information previously provided by user in steps 300 through 320. At this stage, the user may be prompted to either continue or cancel the service event. If the user desires to cancel the service event 326, the system prompts the user to verify the requested cancellation. If the requested cancellation is verified, the user is returned to the home page of the service provider. If, however, the user selects to continue the service event order, then the system displays a successful transaction screen 328.

The successful transaction screen 328 displays for the user the transaction code for the service event. Additionally, the system prompts the user to register with the service provider. Once the user registers, the system processes the user information and displays a successful registration message 327. Additionally, after a successful transaction has been completed 328, the system inquires if the user desires a loaner vehicle application 330. The system also will allow the user to receive directions and a map to the service facility 332. After, the user has successfully completed the transaction, the user can view and print the successful transaction screen 334. Once the user has finished with one successful transaction, the system will inquire to determine if the user needs to schedule another service event 336.

REGISTERED USER ARRANGE SERVICE PROCESS

If a registered user enters the system, then the system immediately prompts the user to enter a login and password 338 for the user. If the user enters a login and the login is invalid, the system prompts the user to enter a new login 340. If the user enters an incorrect password, then the system prompts the user to enter a new password 342. Once the user has successfully entered the login and password, the system determines if the user has any active service events with the service provider 344. If the user has an active service event, then the system displays the active service events 346.

The system then determines if the service provider has received the vehicle from the user for the active service events 348. If the service provider has received the vehicle, then the system displays the vehicle status report 349. If, however, the service provider has not received the vehicle, then the system displays a summary of the active service event transaction 362.

If there are no active service events, then the system prompts the user to enter any new personal information for the user, the vehicle in need of service, and the location of the vehicle 350. Once this information has been entered, the system determines if there is a new responsible person 352 for the vehicle. Additionally, the system determines if the vehicle to be serviced is a new vehicle and the primary vehicle of the user 354. The system also determines if the new address entered should be listed as the primary address for the user 356.

Once this information has been entered, the user is then prompted to enter the primary concerns 358 for the vehicle. The user is prompted to enter the symptoms 308 associated with the vehicle. The user may select safety courtesy inspection inspection 310 to be performed on the vehicle. Moreover, the user may select whether or not the user desires the manufacturer recommended service intervals for recommended preventive maintenance events 312 for the vehicle. Additionally, the user may be prompted to select a solution detail 314, as described previously, for the vehicle.

After the user has entered the primary concerns for the vehicle, the user then selects the time of the service appointment 360. The system then generates a service event summary 362 for the user which includes the time of the service event and other pertinent information provided by the user. The system then determines if the user desires to confirm or cancel the service event 364. If the user confirms the service event then the service event, summary is one again displayed for the user. If, however, the user cancels the service event, then the system determines if the user has any other active service events 366.

Once the user confirms the service event, a successful transaction page 368 is displayed. This page displays the transaction code of the service event, registration number of the user and saves the information provided by the user in scheduling the service event. If the user has active service events, then the system returns the user to the active service events page 346. If the user does not have any active service events, then the user is returned to the home page of the service provider.

SERVICE EVENT MODULE

Figure 3A:
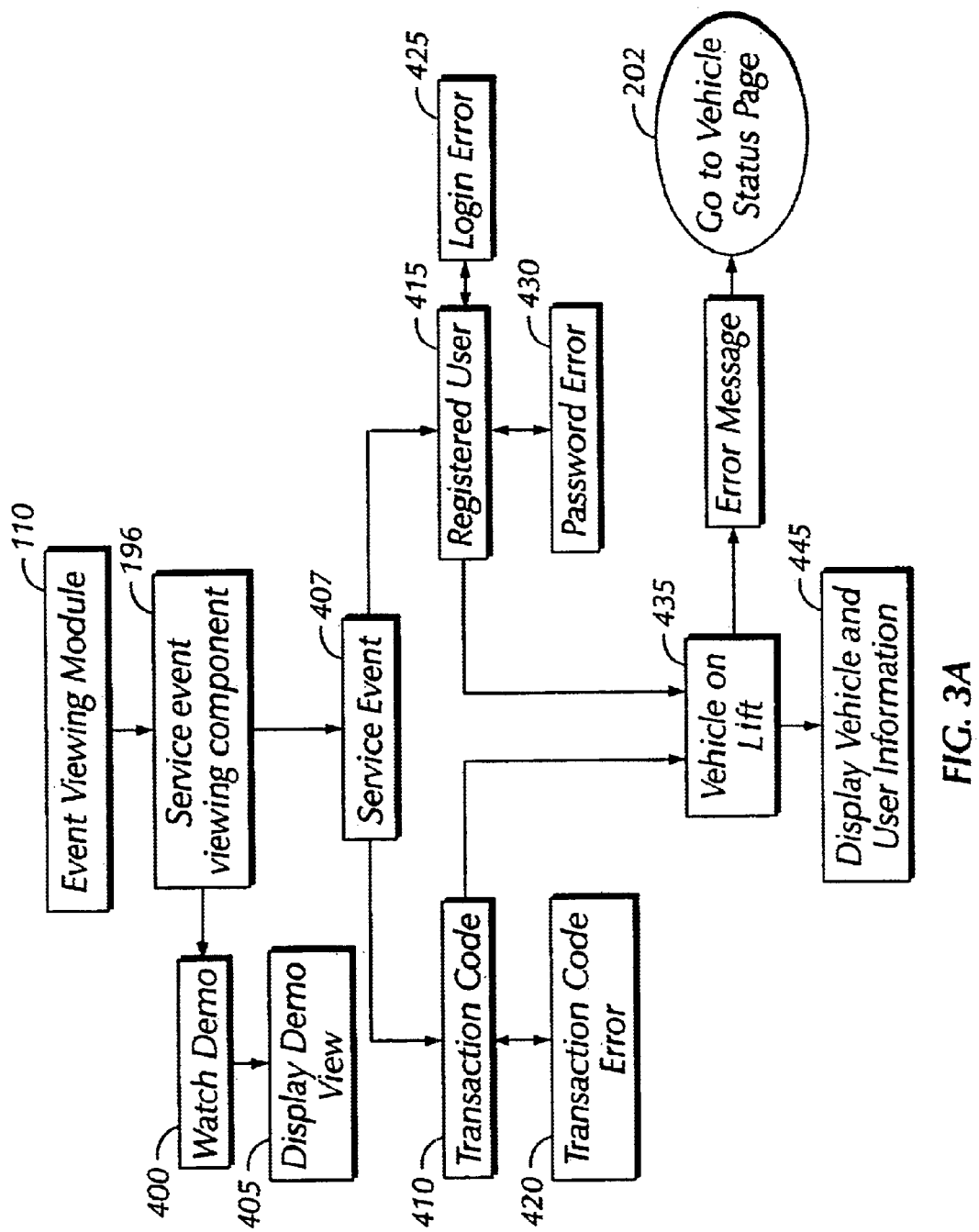
FIG. 3 is a block diagram showing a service event module of the present invention.
FIG. 3b is an illustration of a repair bay housing a service event.

Referring now to FIG. 3a, the service event module 110 of the present invention is depicted by a hierarchical block diagram. The service event module 110, like the service arrangement module, can be accessed by both non-registered or registered users. Once the user has selected the service event module 110, the user can then select either to watch an active service event 196 of FIG. 1, or determine the service status, as in block 202 of FIG. 1.

In FIG. 3a, the user has selected to watch the repair live. By selecting to watch a service event, the user may either watch a demonstration service event 400 or watch the service event 407. If the user selects to watch a demonstration service event, then the system displays the demonstration service event for the user 405. If the user desires to see the service event of the user, then the system requests the user to enter either a transaction code 410, or a login and password 415. The system can also determine if the user is a registered user by placing a cookie in the computer system of the user.

If the user is not a registered user, the system prompts the user to enter a transaction code 410. If the transaction code is invalid, the system displays an error message and allows the user to enter a new transaction code 420. If the transaction code is valid, then the system determines if the vehicle of the active service event is on a lift 435.

Similarly, if the user is a registered user, then the system prompts the user to enter a login and password 425. If the user enters an invalid login, then the system will display an error message and request a new login be entered 425. Likewise, if the user enters an invalid password or forgets the password, the system prompts the user to enter a new password and displays a message to remind the user of the forgotten password 430. Once the registered user has logged onto the system, the system then determines if the vehicle of the service event is on a lift 435.

If the system determines that the vehicle is on a lift, then system will display the vehicle on the lift and the customer information pertaining to the vehicle 445. The customer can view the repair as the repair progresses in a real time video stream provided by a webcam in the facility. If, however, the vehicle is not on a lift, then the system will display an error message and display for the user the vehicle status report 202.

Figure 3B:
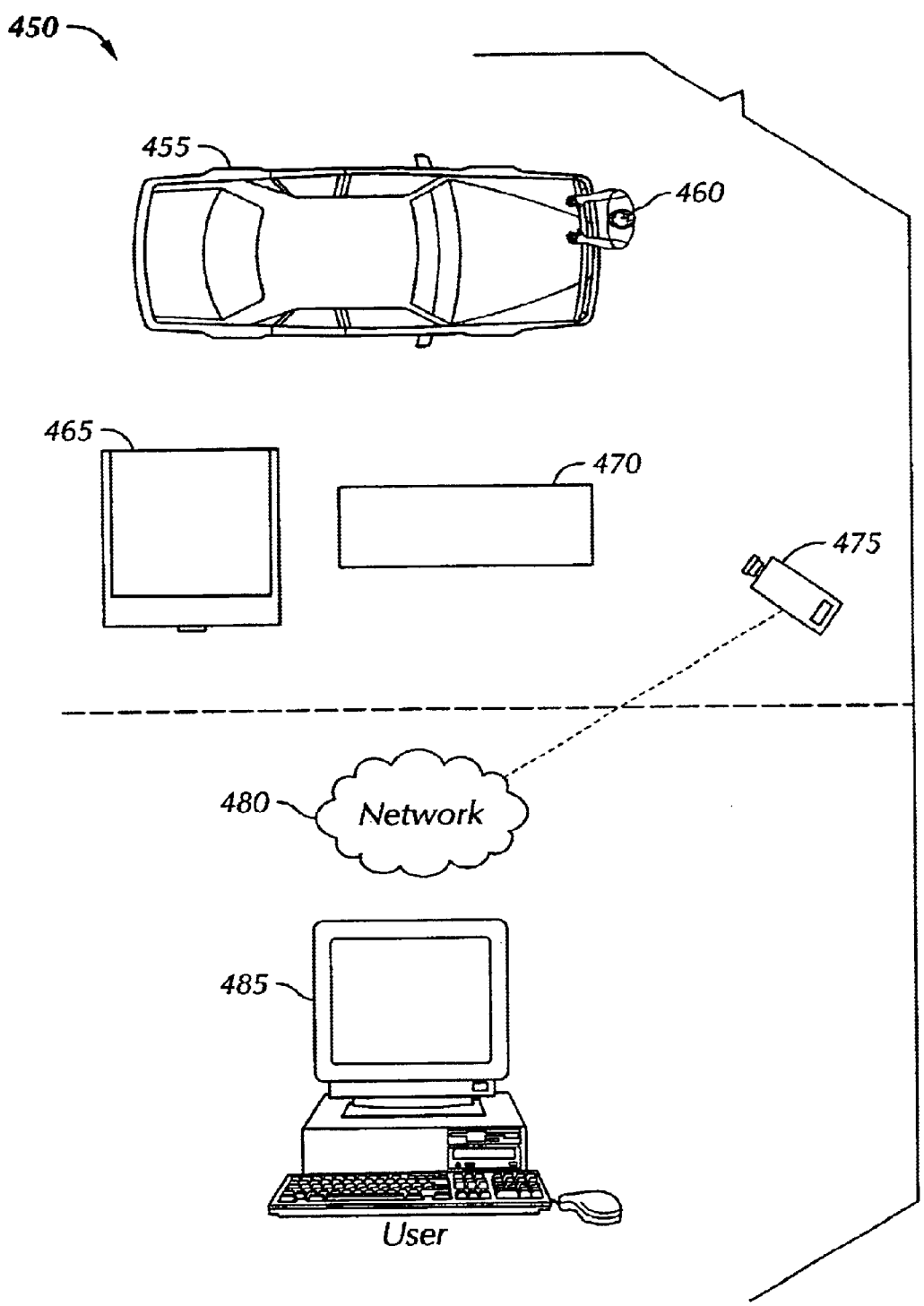

Referring to FIG. 3b, the arrangement of a service bay during a service event is depicted generally as 450. A vehicle 455 is being serviced by a mechanic 460. The service bay may contain the necessary tools and equipment to perform the repairs on vehicle, such as rolling tool kit 465 and a workman bench 470. Positioned above the vehicle is a web camera 475. While the web camera is shown mounted to the ceiling of the repair bay, it will be appreciated that the web camera may be mounted in various positions throughout the repair bay. The web camera web camera 475 is connected through a communications network 480, such as the Internet, to a user computer 485.

Figure 4:
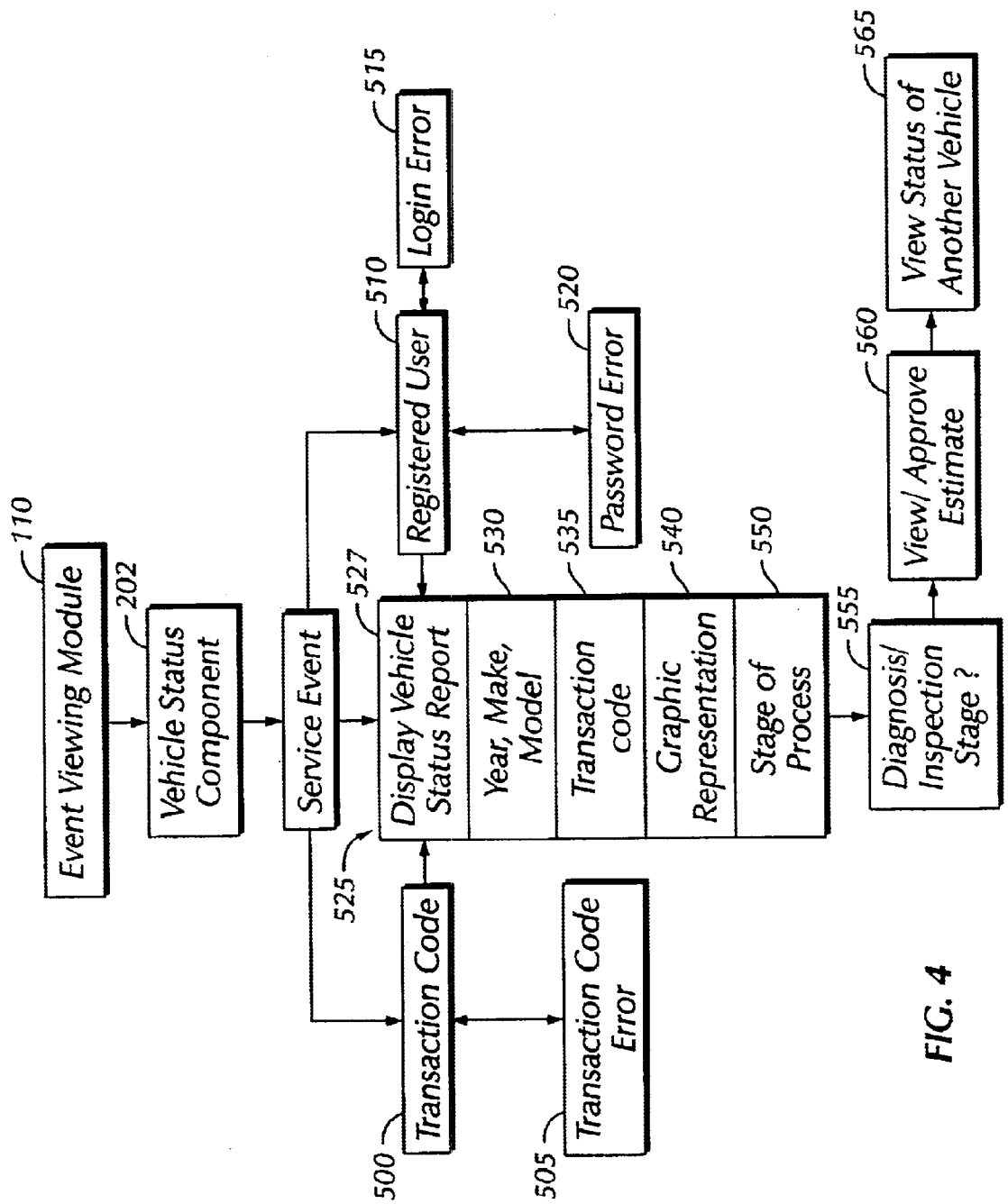
FIG. 4 is a block diagram showing a vehicle status component of the present invention.

Once the vehicle status component 202 has either been selected or displayed, the system prompts the user to enter a transaction code or registration, if the user has not previously entered such information. Referring now to FIG. 4, the vehicle status component 202 is shown in a hierarchical block diagram. If the user has already entered a transaction code or registration number, then the system will display the vehicle status page 525. If, however, the user has not previously entered a transaction code, then the system will ask the user to enter a transaction code 500. If the transaction code entered is invalid the system will display an error message and ask the user to reenter the transaction code 505. Similarly, if the user is a registered user, then the system will ask the user to enter a login and password, if not previously done 510. If the user enters an invalid login, then the system will display an error message and request the user to reenter the login 515. Similarly, if the user enters or forgets the password, then the system will ask the user to reenter the password or display a message to remind the user of the forgotten password 520.

Once a proper transaction code or proper login and password have been entered, the vehicle status page 525 is displayed for the user. The vehicle status page 525 displays a vehicle status report 527 which includes the user the year, make, and model of the vehicle involved in the service event 530. The vehicle status report 527 also displays the transaction number for the service event 535. Additionally, the vehicle status report 527 displays a graphical representation of the repair progress for the vehicle involved in the active service event 540. The vehicle status report 527 displays the repair stage of the vehicle 550. If the vehicle is in the diagnostic/inspection stage and an estimate has been given for the service event 555, then the estimate will be displayed for the user and the user may then view and approve the estimate 560. The user can then view the status of another vehicle 565 involved in a service event, if so desired.

Referring now to FIGS. 5 through 30, an illustrative example of the implementation of the present invention is given as multiple screen shots of the system of a service provider. Although each screen shot depicts one implementation of the present invention as displayed to the user through a global communications network such as the Internet, it will be appreciated that many configurations and arrangements can be used to successfully implement the system.

Figure 5:
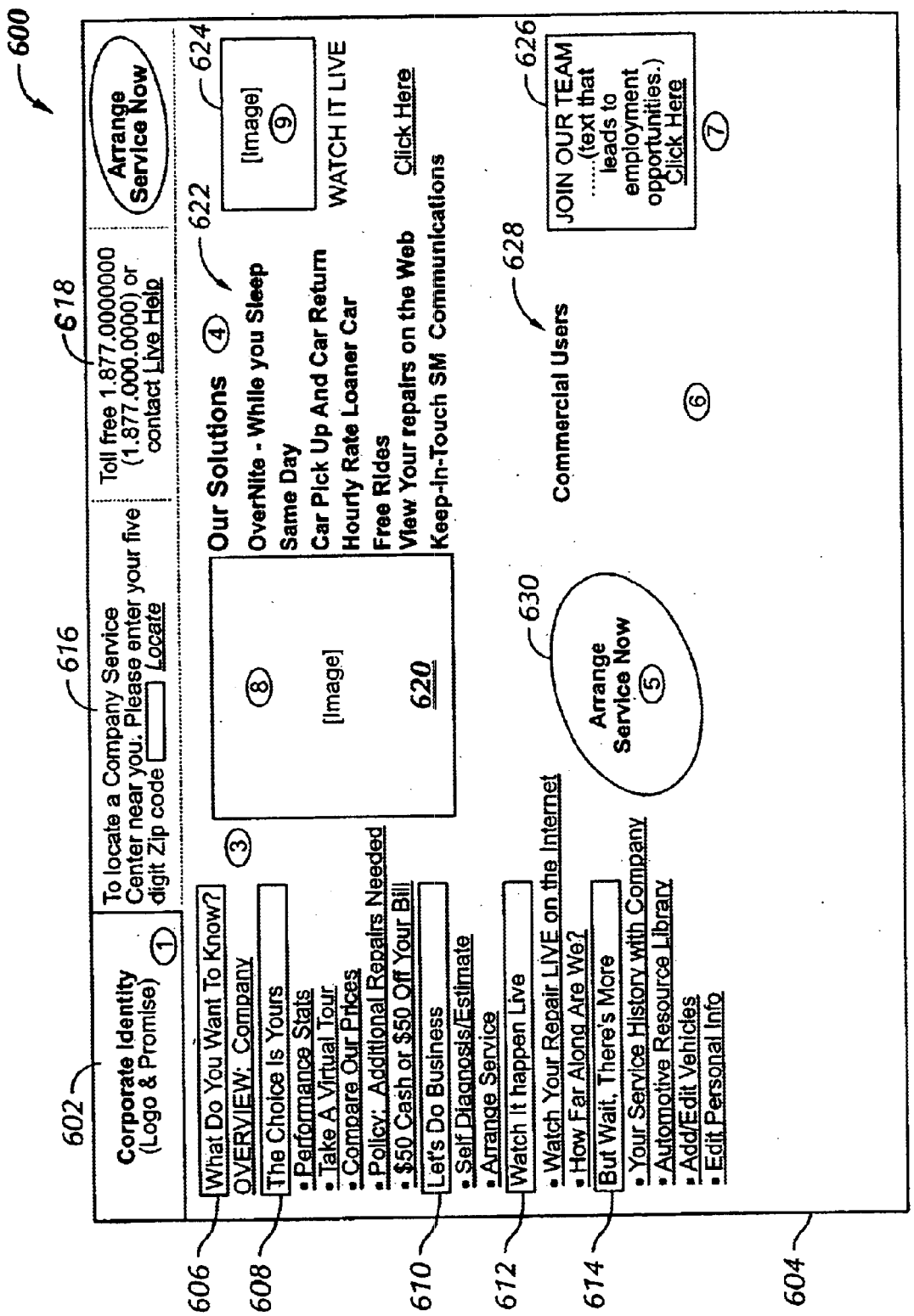
FIG. 5 is a screen shot showing in the home page of the network based service event scheduling and monitoring system.

Referring now to FIG. 5, a home page of the present is shown displaying the various functions present in the system as described in FIGS. 1 through 4. The screen shot is referred to generally as 600. A corporate identity can be placed in the screen shot at 602. A toolbar, by which the user can navigate throughout the system, and the various screens associated with this system is displayed on the left hand side of the screen shot 600. The toolbar contains the overview module 606, the comparison module 608, the service arrangement module 610, the service event module 612, and the service history module 614. As stated previously, each of the modules have multiple functions by which the user can navigate through the system and utilize the services.

A zip code entry slot 616 and a toll free telephone number 618 for the service facility are located in screen shot 600. This zip code entry slot 616 allows the user to determine the closest location of the service provider. An the image of an auto repair facility can be displayed at 620 along solution details provided by the service provider 622. The solution detail enables the user to see the various solutions for making the user's service experience more convenient and manageable.

Similarly an image of the live service event can be displayed at 624. This image allows the user to experience the system's ability to allow the user to view ongoing repairs. An arrange service now button 630 can also be displayed for the user. The arrange service now button 630 allows the user to arrange service for a vehicle via the service arrangement module of the present invention.

Figure 6A:
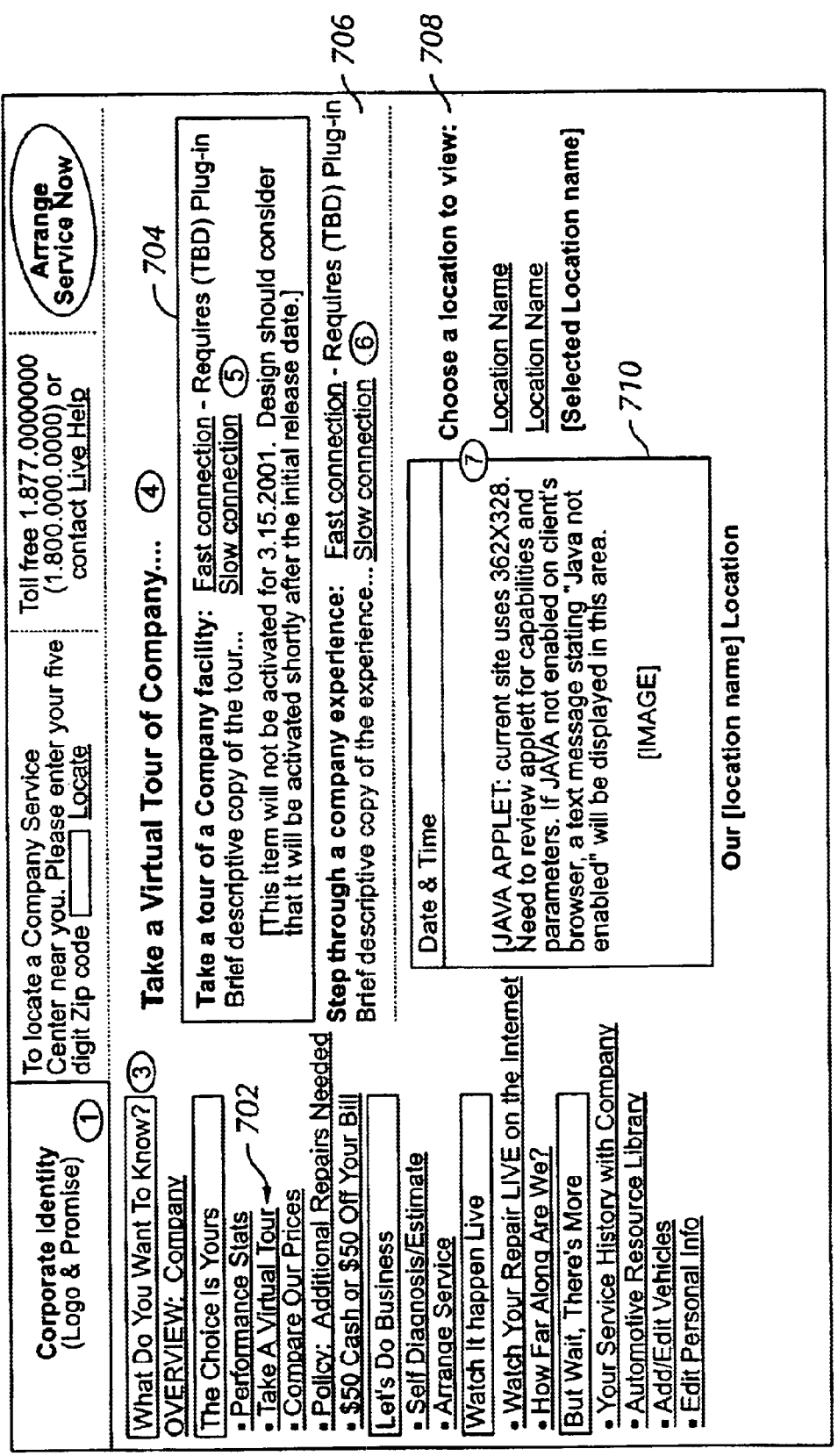
FIG. 6 is a screen shot illustrating the virtual tour capability of the present invention.
Figure 6B:
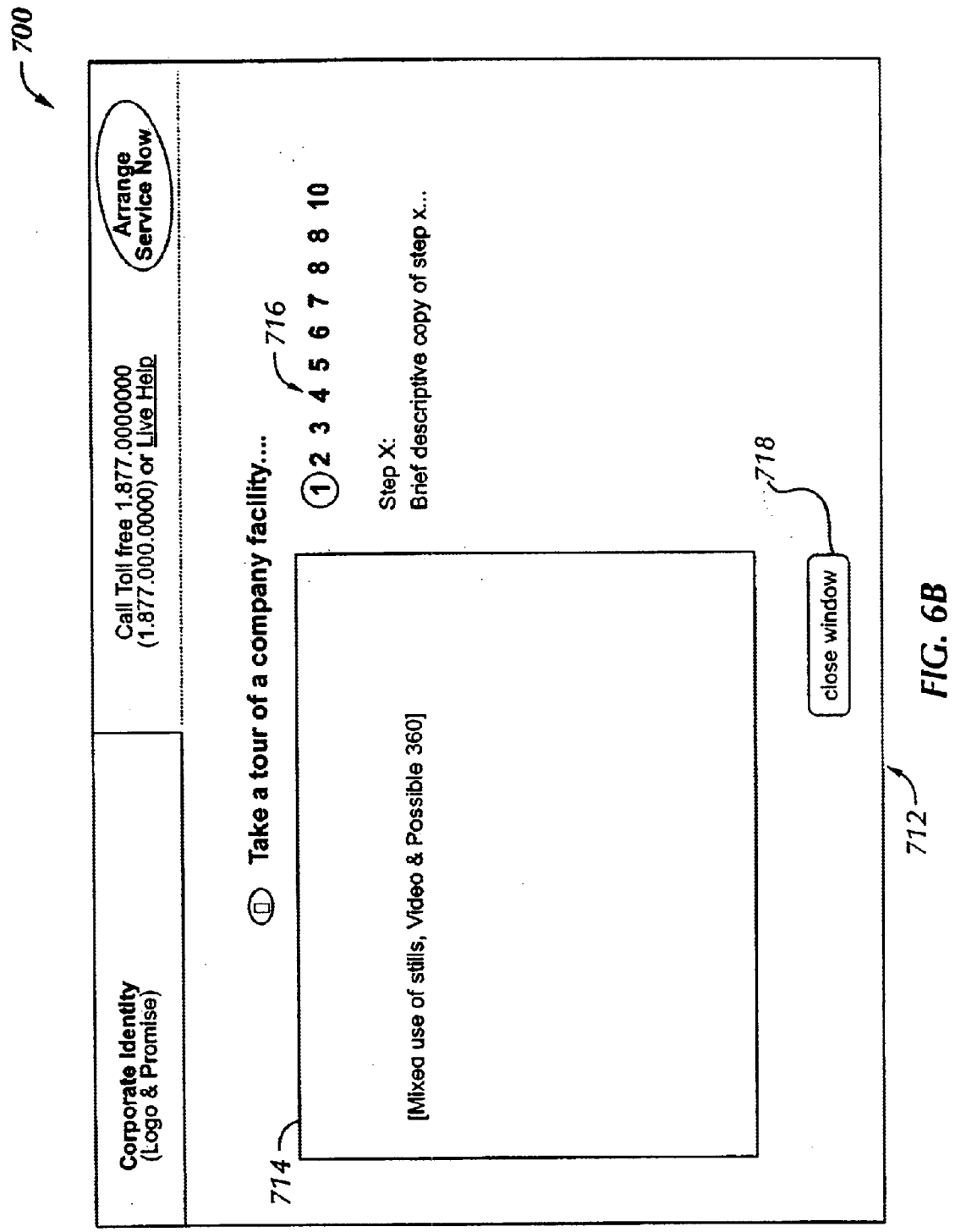

Referring now to FIG. 6, another screen shot of the present invention is similarly depicted as 700. In this screen shot, the user has selected the virtual tour 702. Once the virtual tour has been selected, a virtual tour box 704 is displayed for the user. The virtual tour box 704 enables the user to display via a plug in or slower connection a virtual tour of the service facility. If no virtual tour is desired, the user can walk through the experience of using the service provider 206 by using the same fast or slow connection. During this walk through experience, the user can choose the service facility nearest the location of the user 708.

Figure 7:
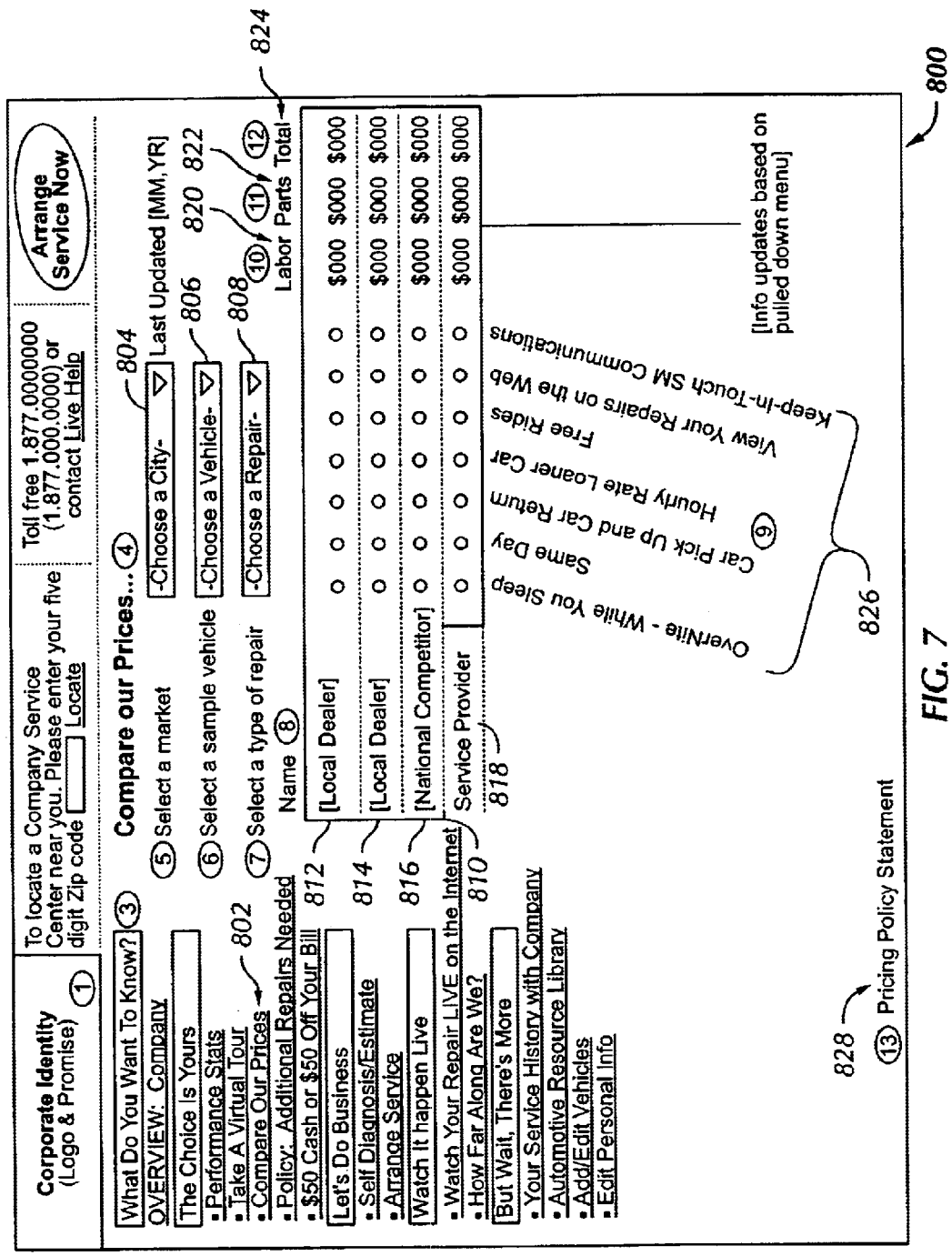
FIG. 7 is a screen shot showing the comparison module of the present invention.

Once the user has selected the type of tour and the location, an image is displayed showing the service facility with the date and time, and the user is given ability to explore the service facility using the streamed image 710. Referring now to FIG. 7, another screen shot depicting the virtual tour screen is generally shown as 712. Here, the service enables the user to walk through the service facility and service experience. A series of steps 716 are provided to the user. Each step allows the user to progress to a different stage of the service process and gain a general appreciation for the service experience. Once a step has been selected by the user, an image stream 714 is projected to user via the communications network. Depending upon whether the user has selected a high bandwidth or a low bandwidth will determine the quality and size of the image, and the transmission speed. After the user has completed the viewing the virtual tour, the user may close the window by selecting the close window button 718.

Referring now to FIG. 8, another screen shot of the illustrative example of the present invention is generally depicted as 800. In screen shot 800, the user has selected the compare prices link 802. Once the compare prices link has been selected, the system will display for the user a comparison model pertaining to user specified criteria. The system allows the user to select a market 804. The market may be a city from which the user would like price comparison. The system may also allow the user to select a vehicle to be compared 806. The system may also allow the user to select the repair to be performed 808. All the selections can be made by using pull down windows associated with each criterion.

After the user has made its selections, the system can then display for the user several different dealers and competitors of the service provider, as in 812, 814, and 816. The system may also list just the comparison to an average competitor. The system may also list the service provider, 818. The block containing all of the information of the service providers and the various criteria and costs is displayed generally as 810. The blocks will contain a series of service features being compared between the service provider and the local dealers 812 and 814, and a national competitor 816. The service features may include overnight service, same day service, car pick-up and car return, hourly rate loaner cars, free rides, viewing repairs on the web, and keep-in-touch communications, all displayed as 826. A price comparison may also be included. The price comparison may list the costs for labor 820, parts 822, and a total cost comparison 824.

Referring now to FIG. 9, a screen shot showing the arrange service component of the present invention is generally given as 900. The screen shot 900 appears when the user has selected the arranged service button 630 from FIG. 5, or in some other way triggered the arrange service component. Once the arrange service component has been selected, the arrange service screen shot is displayed as in 900. The arranged screen shot 900 allows the user to arrange service either as a new user or as a registered user 902. If the user does not have an assigned password and username, then the user can arrange service by taking steps 904 displayed as steps 1 though 6 on the screen shot 900.

In step 1, the non-registered arrange service user process determines if the user desires to bring the vehicle to the service provider or have the service provider retrieve the vehicle 906. The user can choose to have the service provider retrieve the vehicle 908, deliver the vehicle to the service provider but use the on line service 910, or request the service provider contact the user to arrange vehicle acquisition 912. Once the user has selected one of the various options 908, 910, or 912, the system determines if the user has an active service event to either modify or cancel 914.

Referring now to FIG. 10, a screen shot of the second step of the arrange service component is generally depicted as 916. In step two, the system provides the location of the service facility located nearest to the user 920. The system will then prompt the user to enter information for the service event. The system will prompt the user to enter information concerning the make, model, and year of the vehicle 922. The system will then determine from the user the driving condition 924 of the vehicle to be serviced. At this point, the system can determine if the user desires to have his vehicle picked-up or dropped-off. Once the system determines the driving condition of the vehicle, the system then determines if the user desires an hourly rate loaner vehicle 926. After completing the questions provided by the process 922–926, the user may then either return to the previous screen by either selecting the previous button 928 or continue to the next step in the arrange service process by selecting the next button 930.

Referring now to FIG. 11, the third step in the arrange service process is generally displayed as 932. In the third step of the arrange service process, the system prompts the user to enter the problems experienced by the vehicle to be serviced in the window provided by 936. The user can use any language or terms to describe the problems with the vehicle. If the user is cannot describe the problems with the vehicle, the system can then provide the user with common repair services or symptoms 938. The user may then select from the symptoms or services 938 to describe the problems with the vehicle.

After the user has entered the problems with the vehicle, the system then determines if the user desires a free safety courtesy inspection 940. Once the user has completed the information on screen shot 932, the user may return to the previous service step to by clicking the previous button 944 or continue to the next step by clicking the next step button 946.

Referring now to FIG. 12, a screen shot showing the fourth step of the arrange service process of the present invention is generally depicted as 948. In step 4, the system will display for the user the times available for service 952 at the service facility. The system will then display the time intervals available for service in two screens 954 and 956, respectively. The screens 954 and 956 display the schedule of the service facility for preset time period, such as seven days. Within the schedule, the system will display time intervals for the preset time period, such as thirty minutes. The time intervals graphically change colors depending upon the availability of the particular time interval. The color scheme represents the availability of the particular time interval, such as available, going fast, and gone. The user can select the time interval that the user desires for their service event by clicking on the time interval displayed in the displayed schedules 954 and 956. Once the user has selected an available time interval, the system marks the time interval for the user. The user may then return to the previous step in the arrange service process by clicking the previous button 958 or proceed to the next step in the arrange service process by clicking the next button 960.

Referring now to FIG. 13, a screen shot showing the fifth step of the arrange service process of the present invention is depicted generally 962. In step five, the system asks the user to enter information concerning the user. The system asks the user to enter a salutation for the user and a first name and last name for the user. The user is then prompted to enter a primary phone number, an alternate phone number, and an e-mail address 968. The system then determines if the user desires a loaner mobile phone 970 for use during the service event. The system will then prompt the user to enter a street address where the vehicle can be picked-up for the service event 972. If the user desires to have the vehicle returned to a different location, the user can verify that the return location is within the vehicle return area of the service provider 974.

If the user has any special instructions for the vehicle such as alarm systems, special driving problems, special performance problems about the car, and the like, the user can enter those instruction in the window 976 provided by the system. Once the user has completed all the personal information, the user may return to the previous arrange service step by clicking the previous button 978 or continue on to the next arrange service step by clicking the next button 980.

Referring now to FIG. 14, a screen shot displaying sixth 6 of the arrange service process of the present invention is generally displayed as 982. In step 6, the system provides a detailed summary to the customer concerning the information entered in the previous five arrange service steps. The system provides the user with the contact information 986 that had previously been provided by the user including name, telephone number, and e-mail address for the user. The system provides the vehicle information 988 including the year, make, and model of the vehicle scheduled for the service event and whether the vehicle will be picked-up or dropped off. The system provides the address 990 from which the vehicle will be picked-up, if pick-up is desired. The system displays the time 992 for the pick-up of the vehicle.

The system displays the location 994 of the service provider performing the service event. The system lists the services 996 to be performed on the vehicle and the amount that will be charged for each service, including taxes. The system will also display the total price for the service event. The system displays whether a keep-in-communication device 998 has been requested by the user. The system displays whether the user has requested an hourly rate loaner vehicle 1000. Each section of the summary provided by the system 988 to 996 has an edit button 1001 associated with it. If the user selects the edit button 1001 of any section, the system will return the user to the arrange service step where the information was entered and allow the user to change the information. After the user has completed reviewing and editing the summary, the user may return to the previous arrange service step by clicking the previous button 1002, may confirm the service event in the summary by clicking the confirm this appointment button 1004 or may cancel the service event by clicking the cancel button 1006.

Referring now to FIG. 15, a confirmation page of the arrange service process is generally displayed as 1008. On confirmation page 1008, the transaction code 1010 for the service event being processed by the system is provided to the user. The transaction code 1010 is a unique number to each individual user, service event, and vehicle. The transaction code 1010 can be used by the customer to check on their vehicle status, view the vehicle while it is being repaired, and other functions within the system.

The system will allow the user to view or print the details of the service event by clicking the view/print details button 1012. If the user has requested a loaner vehicle, the system will display information on the loaner vehicle and allow the user to fill out the loaner vehicle application form online 1014. The system also displays for the user information regarding registration 1016. If the user desires to become a registered user, the system allows the user to select a user identification or login 1018 and a password 1020. Once the user has entered the password, the system prompts the user to reenter 1022 the password. Once the user identification 1018, password 1020, and the reentered password 1022 have been entered into the system, the user can click on the register button 1024 and register with the service provider.

Next, the system will allow the user to view a map and get directions 2026 to the service facility. Generally, the maps will be provided by generic map or an outside subscription service, such as MapQuest®. After the user has received his confirmation, completed the loaner vehicle application, and registered, the user can then choose to arrange additional service events by clicking on the arrange service for additional vehicle button 1028 or the user can return to the homepage by clicking on the home button 1030.

ARRANGE SERVICE-REGISTERED USER

Figure 16:
FIG. 16 is a screen shot showing the beginning of the arranged service process for a registered user.
Figure 26:
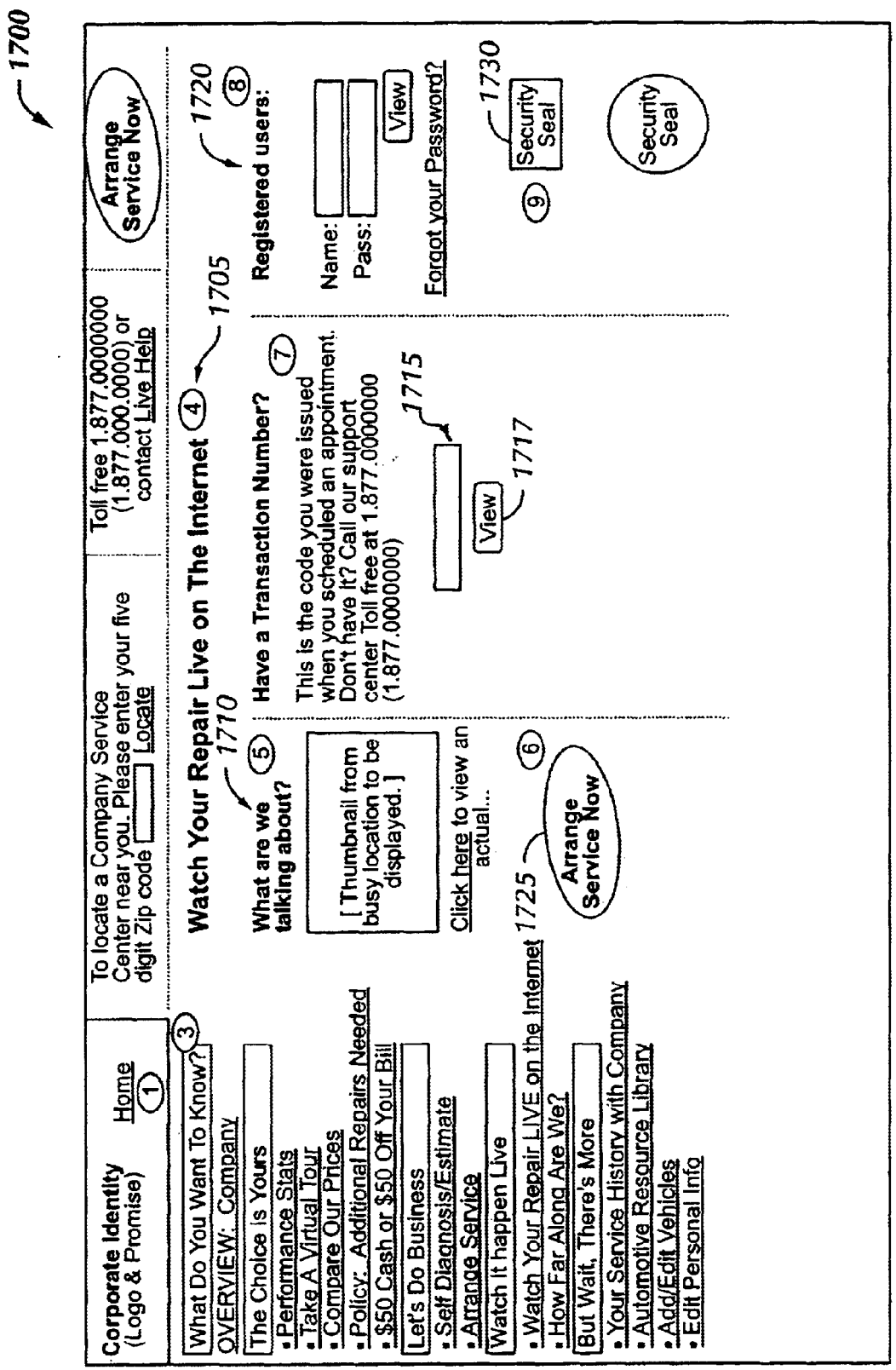
FIG. 26 is a screen shot showing the main page for the service event-viewing module of the present invention.

Referring now to FIG. 16, the beginning of the process for a registered user is generally depicted by the screen shot 1100. Once the system recognizes the user as a registered user, typically by placing a cookie on the computer of the user, the system will display a greeting message 1102 to the user. After the greeting message 1102, the system will prompt the user to enter his username/login 1104 and password 1016. If the user has forgotten the password, the system can prompt the user with a reminder question selected by the user. Once the user has entered the username and password, the user can click on the next button 1108 and proceed to the next step in the service process. Also, the user may enter security seals on the transaction by pressing the security seal button 1110. The security seal will enable the user to secure all the information being provided to the service provider.

Once the user has entered a valid username and password, the system displays the first step in the arrange service process depicted in FIG. 17 as the screen shot 1112. In step one of the registered user arrange service process, the system determines the person responsible for the service event. The system will display the titles, names, and e-mail addresses of the persons associated with the user as in 1116 and 1118. If the user desires to enter a new person, the user may click on the new button 1144 to add the new responsible person.

The system will then ask the user to select a telephone from the primary telephone number 1120 and the alternative telephone number 1122. Additionally, the user may select to have the service provider call them directly to determine this information by pressing the call me button 1124. The system then determines if the registered user desires a loaner mobile phone 1126 for use during the service event. The system will also display the vehicles previously serviced by the service provider 1128 to determine which vehicle is to be serviced. The system will be display the make, model, and year of each vehicle previously serviced as in slots 1130 and 1123, and will enable the user to edit, delete, and view the history of the vehicles. If the user is unsure of the specifics, the user can click on the unsure specifics button 1134.

Next, the system will determine the location of the vehicle 1136. The system will display prior vehicle locations to determine if the vehicle to be serviced is at one of the prior locations or at a new location. If the vehicle is at a new location, the user may click on the new button 1148 and enter the new street location into the system. The system will then allow the user to enter any special instructions 1138 for the vehicle being serviced. If the user anticipates the vehicle is to be dropped off at a different location from the pick-up, the user may check, by clicking the "click here" button, to determine if the return area is within the area of the service provider. Once the information of step 1 of the arrange service process has been completed by the user, the user may click on the next button 1142 to proceed to step 2 of the arrange service process.

Referring now to FIG. 18, a screen shot depicting a new responsible entry form is generally displayed as 1150. The new responsible person entry form may be displayed when the user selects the new button 1144 for the responsible person entry 1114 of FIG. 17. Once the new button has been selected, screen shot 1150 is displayed for the user. The screen shot 1150 enables the user to enter a new responsible person for the vehicle serviced under the username and password.

The system prompts the user to enter a salutation for the new responsible person 1152, the first name of the new responsible person 1154, and the last name of the new responsible person 1156. The system will also prompt the user to enter a primary telephone number for the new responsible person 1158 and an alternative telephone number for the new responsible person 1160. The system will further prompt the user to enter an e-mail address for the new responsible person 1162. If the user desires the new responsible person to be the primary contact for all vehicles under the username and password, the user may select box 1164 and set the new responsible person as the default contact person. Once the user has finished entering the information for the new responsible person, the user can add the information to the profile by clicking the add button 1168 or may cancel the entry by clicking the cancel button 1166.

Referring now to FIG. 19, a screen shot displaying the new vehicle entry form is generally depicted as 1170. The new vehicle form can be displayed when this user clicks on the new button for the vehicle to be serviced 1146 of FIG. 17. Once the new vehicle button 1146 of FIG. 17 has been selected, the screen shot 1170 displaying the new vehicle entry form is displayed for the user. The entry form allows the user to enter the make of the new vehicle 1172, the model of the new vehicle 1174, and the year of the new vehicle 1176. If the user desires the vehicle to be the default vehicle for the username and password, the system allows the user to check box 1178 and enter the vehicle as the default vehicle. Once the user has completed all the information, the user may add the vehicle to the system by clicking the add button 1182 or may cancel the entry by clicking the cancel button 1180.

Referring to FIG. 20, a screen shot depicting the new address entry form is generally displayed as 1184. The new address entry form is displayed when the user clicks the new button 1148 in the address portion of FIG. 17. Once the new address button 1148 is selected, the system displays the screen shot 1184 allowing the user to enter the new address into the system. The system prompts the user to enter the zip code 1186 and the street address 1188 for the new address. If the user desires the new address to be used as the default address, the user can select box 1190 and set the new address as the default. Once the user has entered the information concerning the new address, the user may verify the new address by clicking the verify button 1194 or may add the new address to the system by clicking the add button 1196. If the user does not desire to add the information to the system, the user may click on the cancel button 1192.

After step 1 of the arrange service process has been completed, the user will move to the second step of the arrange service process as displayed by the screen shot 1236 in FIG. 21. In step 2 of the arrange service process, the system determines if the vehicle is in drivable condition or if towing will be required 1238. It will be appreciated that slot 1238 only appears if the user has previously requested pick-up service from the service provider.

Next, the system determines if the use would desire a loaner vehicle 1240 during the service event. The system then determines if the user needs the vehicle picked-up without explanation of the service needed or picked-up for the manufacturer recommended service 1242. The user may also enter a diagnosis of the problems and conditions of the vehicle that needs repair or servicing in the window 1244.

If the user does not desire to enter a description, the user may select common repair services or symptoms 1246. By selecting the add button 1247, the user can increase the number of problem areas or symptoms displayed for the user. The system then determines if the user desires a free safety courtesy inspection 1248 of the vehicle. The user may also enter a pre-approved dollar amount 1249 for repair services. Once the user has completed the information in the second step of the arrange service process, the user can return to the previous step of the arrange service process by clicking the previous button 1250 or continue to the next step of the arrange service process by clicking the next button 1252.

Referring now to FIG. 22, the third step of the arrange service process is shown by the screen shot 1254. The third step in the arrange service process for registered users is the same as for non-registered users. The system prompts the user to select a time for the service event to occur. The available time intervals are displayed for the user in two time periods, the same day time period 1260 and the overnight time period 1262. Once the user has selected a service, the user can go back to the previous step of the arrange service process by clicking the previous button 1264 or proceed to the next step of the arrange service process by clicking the next button 1266.

Referring now to FIG. 23, the fourth step in the arrange service process is generally depicted as screen shot 1268. In step 4, a summary page detailing the information concerning the service event will be displayed for the user. The system displays the contact information 1272, the year, make, and model of the vehicle 1274 along with the pick-up/drop off instructions, the address 1276 from which the vehicle will be picked-up, the time 1278 for the scheduled pick-up of the vehicle, the service facility location 1280 where the service event will be conducted and the various repair needs 1282 for the vehicle, along with the dollar amounts for each repair, subtotals, taxes, and a grand total for the service event. The user can edit any of the service items displayed in 1272 through 1282. The system will also display for the user an indication of whether the user desired to be provided a loaner wireless phone 1284 or an hourly rate loaner vehicle 1286. Once the user has viewed and approved all the information on the summary page 1268, the user may go back to the previous step in the arrange service process by clicking the previous button 1288, confirm the service event by selecting to confirm this appointment button 1290 or cancel the service event by selecting the cancel button 1292.

Referring now to FIG. 24, a service event confirmation page is displayed generally as screen shot 1300. The service event confirmation page 1300 will be displayed once the user has confirmed the appointment from the fourth step of the arrange service process. The service event confirmation page displays the transaction code 1302 for the service event. In addition, the user can view or print the summary page of step 4 of the service process by clicking the view/print details button 1304. If the user selected to have a loaner vehicle, the user may fill out the loaner vehicle application by selecting the "click here" 1306. Once the user has confirmed all the information on the service event confirmation page 1300, the user may then arrange service for another vehicle by selecting the arrange service for another vehicle button 1308 or return to the home page of the service provider by selecting the home button 1310.

Referring back to FIG. 21, once the add button 1247 has been selected to detail more problems or symptoms, a pop-up window is displayed for the user as depicted by screen shot 1400 of FIG. 25. The pop-up window will provide the user with extensive lists to describe the symptoms of the vehicle. The vehicle 1405 of the user will be displayed at the top of the screen, including the year, make, and model of the vehicle. The user will then have a list of selections for the problem areas 1410 associated with the vehicle. Once the user has selected a problem area, the user may then select the details about the problem area from the list of details 1415. After the details have been entered, the user will select conditions that correspond to the different details and problem areas from the list of conditions 1420. After the user has selected a problem area, details and conditions, the system will display the price 1425 for parts and labor to service the problem area. Once the user has completed all of the sections of screen shot 1400, the user can choose to add these symptoms to his service list by selecting the add button 1435 or cancel the symptoms by selecting the cancel button 1430.

Referring back to FIG. 5, the user has the option to watch the service event live by selecting the watch your repairs live on the Internet link of FIG. 5. Once the user has selected to watch a repair live, a screen shot 1700 of FIG. 26 will be displayed to the user. At this stage, the user will have three possible selections. The first selection will allow the user to sample the live video stream 1710. If the user has a transaction code for service event, the user may enter the transaction code in slot 1715 and click on the view button 1717 to begin watching the service event. The user may also enter the username/login and password 1720 which will take the user to a listing of all service events for the user and enable the user to view those vehicles, if the vehicles are currently being repaired. Additionally, the user may arrange a new service event by clicking on the arrange service now button 1725.

Figure 27:
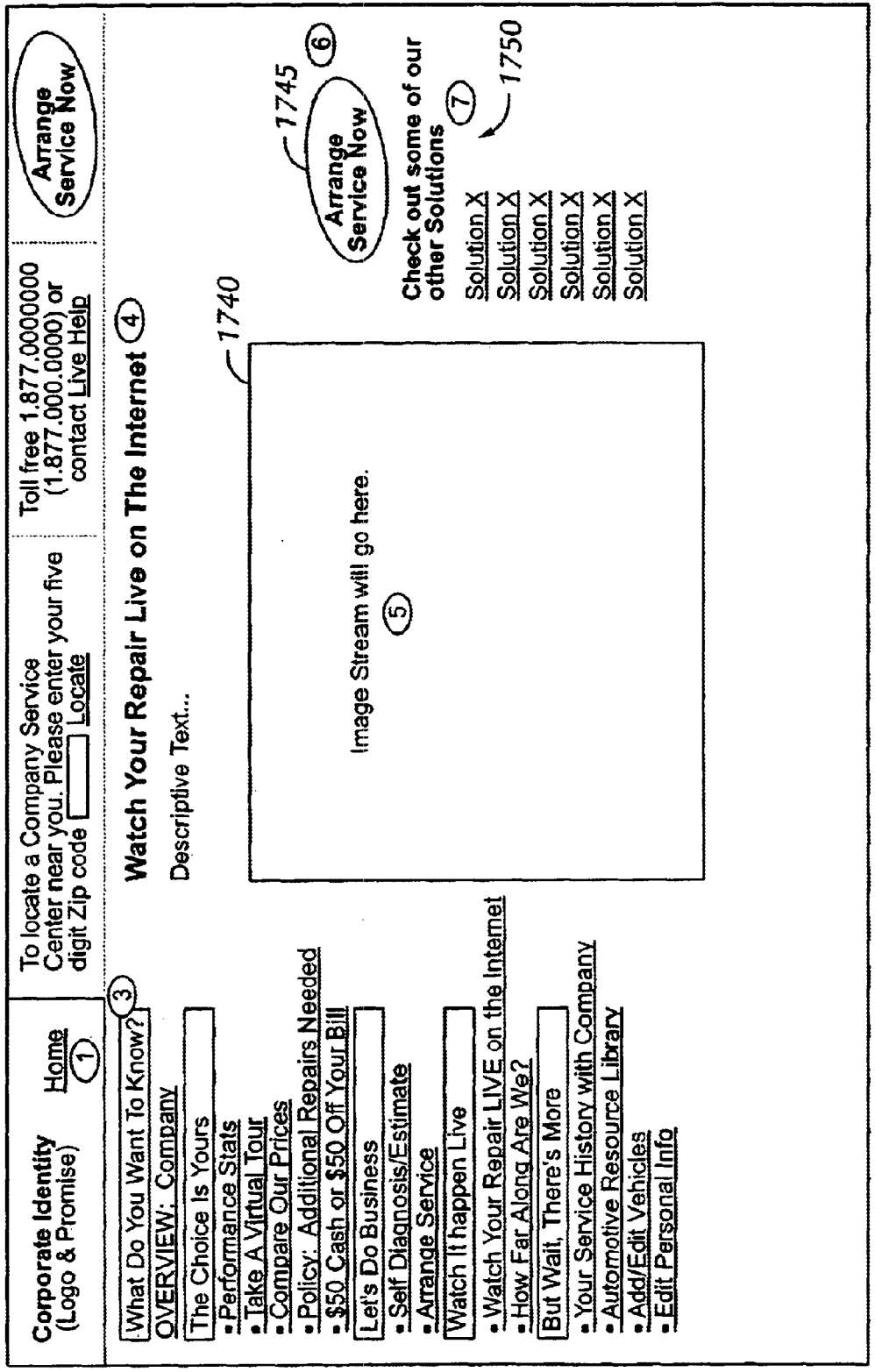
FIG. 27 is a screen shot showing the live image dream of the service event-viewing component.

Referring now to FIG. 27, once the user enters a transaction code or enters a valid username/login and password, a screen shot 1755 is displayed for the user, including a live image stream 1740 of the vehicle undergoing the service event. As the user is watching the repair, the user may select to arrange for a new service event by clicking on the arrange service now button 1745. Also, the user may look at and coordinate some other solutions for dealing with service appointments by clicking on a solution, shown as 1750.

Figure 28:
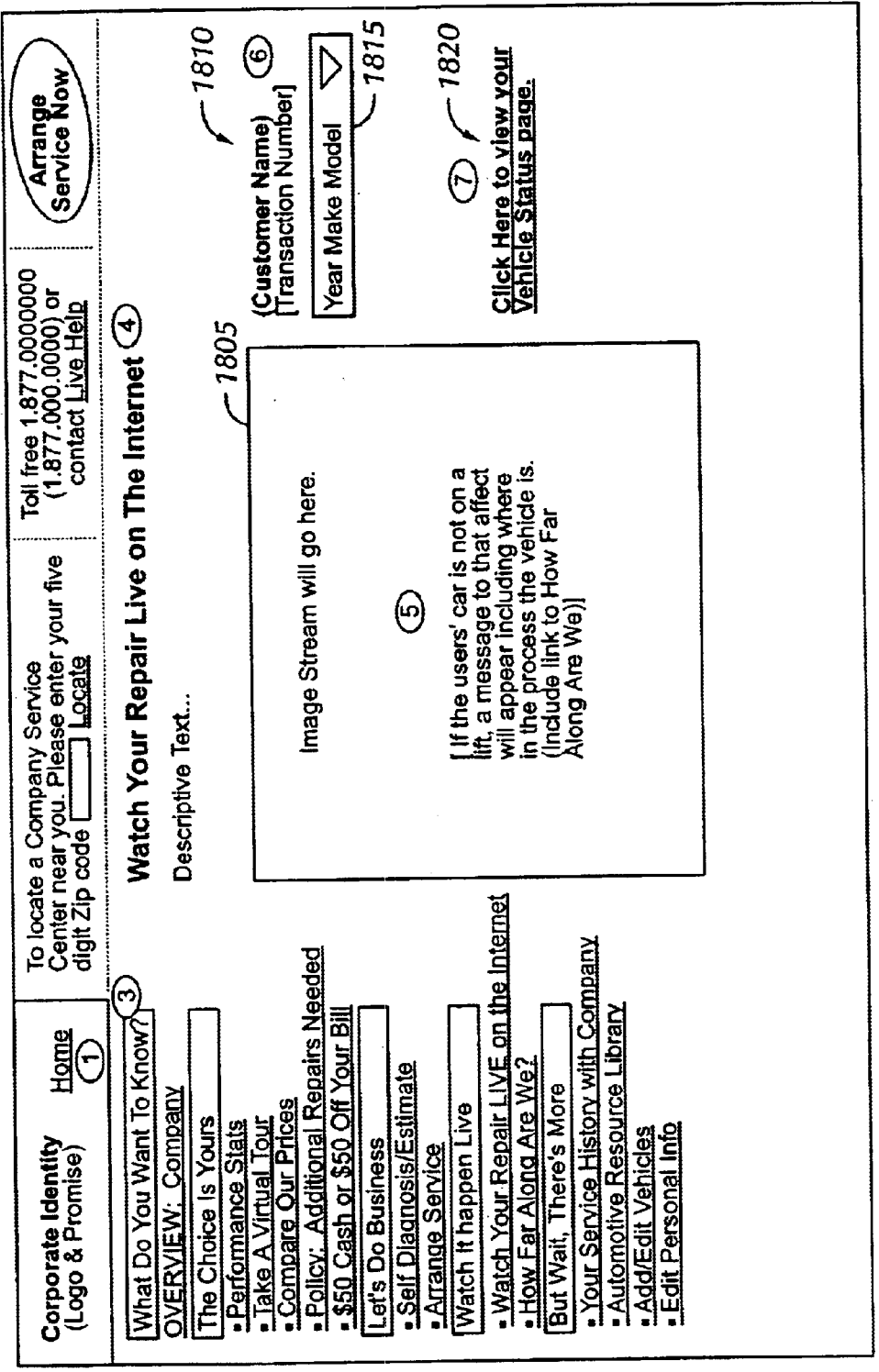
FIG. 28 is another screen shot showing the live image dream of the service event-viewing component.

Referring now to FIG. 28, once the screen displaying the live image stream 1800 is displayed, the user can watch the repair live. The system will also display the transaction code 1810 and the year, make, and model of the vehicle 1815. The user will also have the option of viewing the vehicle status by clicking the vehicle status page 1820. If the user's car is not on the lift at the time the system is directed to stream the video of the live repair, an error message will be displayed for the user and the vehicle status page will be displayed.

Figure 29:
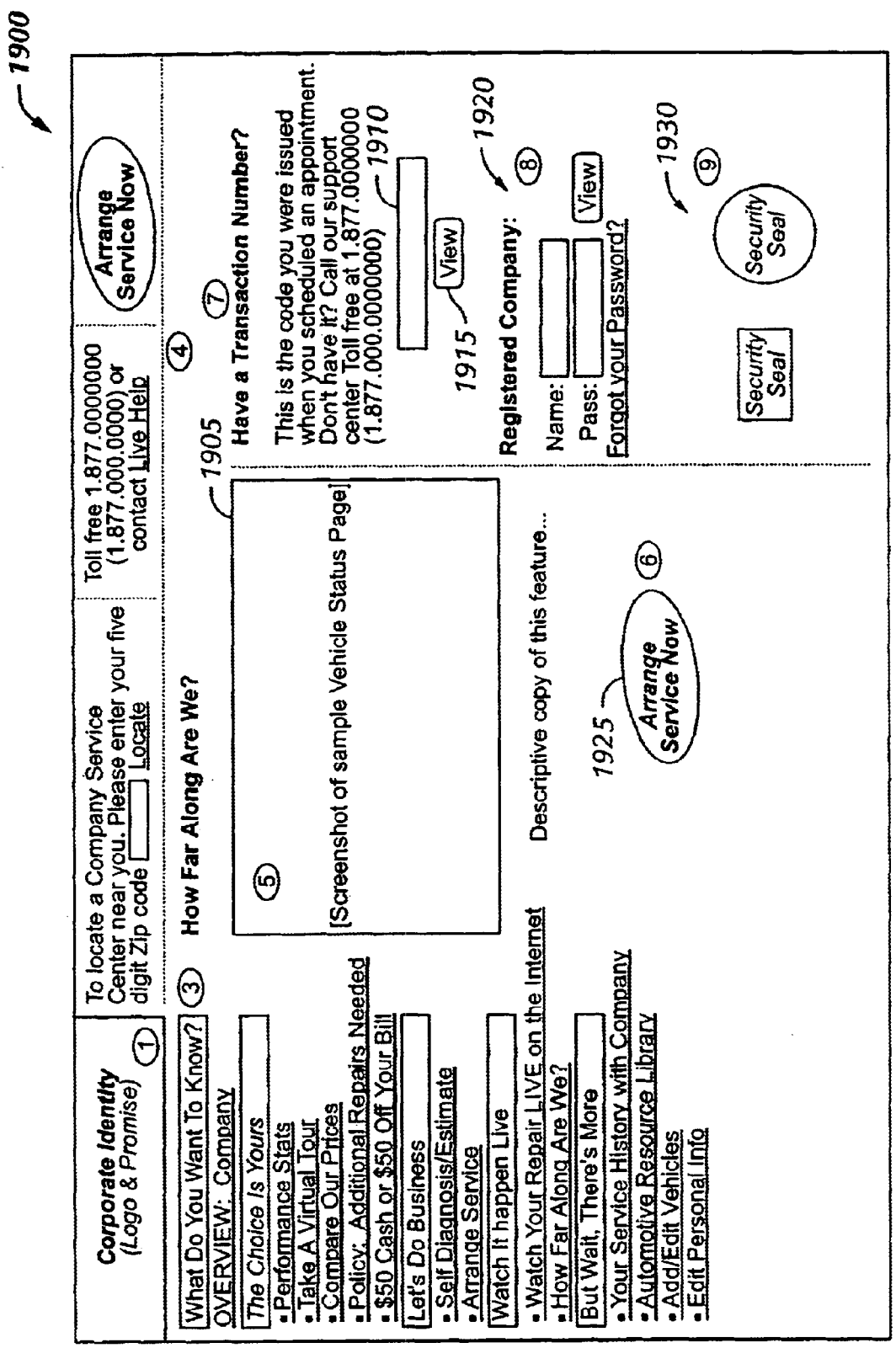
FIG. 29 is a screen shot showing the general vehicle status page.
Figure 30:
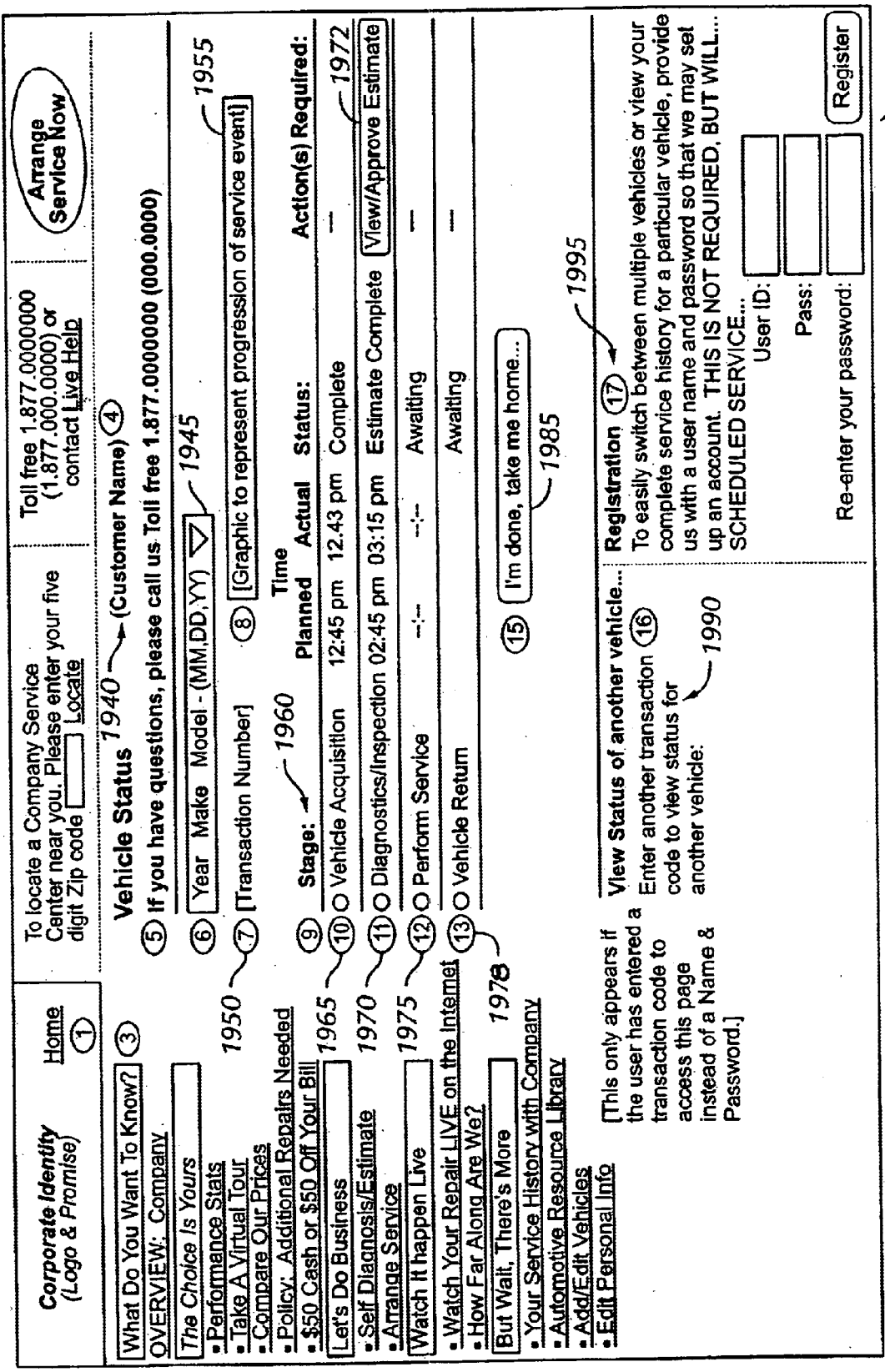
FIG. 30 is a screen shot showing the vehicle status report of the present invention.

Referring now to FIG. 29, once the user has selected the vehicle status button or has been transferred to the vehicle status page, then the system will display the vehicle status page generally depicted as 1900.

Once the vehicle status page is displayed, the user will be shown a sample of the vehicle status report 1905. The user can enter a transaction code 1910 or a username and password 1920, if not previously done. The user can then click the view button 1915 to display the vehicle status report. The user may also arrange for a new service event by clicking the arrange service now button 1925. Once the user has entered a password or a transaction code and a vehicle has been selected, the vehicle status report 1935 is displayed for the user as in FIG. 30. The vehicle status report will display the name of the user 1940. The vehicle status report will also display the year, make, and model of the vehicle 1945 and the transaction code for the vehicle 1950. The vehicle status report will also display a graphical representation 1955 of the progress of the service event. The vehicle status report will display the stage of the service event, the time planned for the service event, the actual time taken for the service event thus far, the status of the service event and the action required for the service event, as in 1960. The vehicle status report will display the time 1965 the vehicle was acquired and the diagnosis/inspection 1970 of the vehicle.

Once the diagnosis/inspection of the vehicle has been performed, the vehicle status report will enable the use to view and approve the estimates 1972 for the vehicle repairs. The system may then provide the user with the performed services 1975 on the vehicle and the information about vehicle return 1978. Once the user has completed viewing the vehicle status report, the user may end the session by clicking button 1985. Additionally, the user may enter a new transaction code 1990 and view a different vehicle status report. Also, if the user is not registered the user may register 1995 with the service provider.

Referring now to FIG. 31, the personal information screen 2000 of the service event coordinator is shown. The personal information screen will be displayed for a user after the user has selected the edit personal information link from the toolbar 604 in screen shot 600 of FIG. 5. After the personal information screen has appeared, the user may edit the personal information in their profile. The system will display the people 2005 who are authorized to act under the user's registration. After each person's name, the system will allow the user to view or edit the information about the person by selecting the view/edit link 2010 or delete the person selecting the delete link 2015.

The user may also add a new person to the personal information page by selecting the new button 2020. The system will also display for the user the telephone numbers 2025 listed in the user's record. The user may edit these telephone numbers by selecting the edit link by selecting 2030 or delete the telephone numbers by selecting the delete link 2035. Also the user may add a new telephone numbers to the user record by selecting the new button 2040. The system may further display for the user the address information for the user. For each address shown 2045, the system will tell the user if the address is an address that is available for pick-up by the service provider or must be a drive-in. The user may edit the address by selecting the edit link 2050 or delete the address by selecting the delete link 2055. The user may also add a new address to the new record by selecting a new button 2060.

Once the user has completed the personal information page, the user may choose to adjust the user service preferences by selecting the service preference button 2065 or the user may choose to edit the vehicles under the user record by selecting the edit vehicles button 2070. If the user does not desire to change the service preferences or edit vehicles, the user may select the "I'm done" button 2075 and return to the home page. If the user has entered a transaction code to access the personal information page, the system will allow the user to enter a different transaction code 2080 to view the information for different service event. If the user has entered the page using a transaction code, the system will display registration information 2085 for the user allowing the user to register with the service provider.

What is claimed is:

1. An automotive service monitoring system comprising:

at least one vehicle service bay at a service facility, the service bay being operable to provide for the performance of service events on a user's vehicle, the user's vehicle having a user associated therewith;

at least one video camera positioned with respect to the service bay and a user's vehicle to provide for transmitting images of the user's vehicle;

a computer comprising a network server adapted to receive images from the video camera, the network server being connected to a network accessible by a user computer whereby the user of the user's vehicle disposed in the service bay may view a service event being performed on the user's vehicle; and a user database operably connected to the network server, the database including at least a service arrangement module and a service event viewing module whereby the user may obtain access to the database to obtain information comprising viewing an active service event on the user's vehicle via the video camera and determining the service status of the user's vehicle pursuant to the user entering one of a transaction code and password via the user computer operably connected to the network server via the network comprising the Internet.

2. The service monitoring system set forth in claim 1 wherein:

the database is configured to provide for the user to view images from the video camera only if the user's vehicle is in the service bay.

3. The service monitoring system set forth in claim 1 including:

a component of the database operable to allow the user to view a demonstration repair corresponding to a repair being performed on the user's vehicle.

4. The service monitoring system set forth in claim 1 including:

a component of the database operable to allow the user to view and approve a cost estimate for a repair to be performed on the user's vehicle.

5. The service monitoring system set forth in claim 1 including:

a component of the database accessible to the user to provide for the user to make payment for the repairs to the user's vehicle.

6. The service monitoring system set forth in claim 1 including:

a service arrangement module associated with the database and operable for prompting the user via the user's computer and the network server to enter user and vehicle information related to the service event and for providing a transaction code to the user.

7. The service monitoring system set forth in claim 1 including:

a component associated with the database for receiving one of a login identifier and a password for the user for giving the user direct access to the components of the database related to arranging for service to be performed on the user's vehicle, viewing the user's vehicle via the video camera and determining the service status of the user's vehicle.

8. A method of monitoring an automotive service event via a communications network comprising the steps of:

providing at least one vehicle service bay at a service facility, the service bay being operable to provide for the performance of a service event on a user's vehicle, the user's vehicle having a user associated therewith, the service bay including at least one video camera positioned with respect to the service bay and the user's vehicle to provide for transmitting images of the user's vehicle, a computer comprising a network server adapted to receive images from the video camera, the network server being connected to a network accessible by a user computer whereby the user of the user's vehicle disposed in the service bay may view a service event being performed on the user's vehicle, and a user database operably connected to the network server, the database including at least a service arrangement module and a service event viewing module whereby the user of the user's vehicle may obtain access to the database;

accessing the database via a user computer, a network comprising the Internet and the network server;

entering one of a transaction code and a password via the user computer; and selectively obtaining access to the service arrangement module to obtain information comprising the service status of the user's vehicle and viewing the user's vehicle directly in the service bay via the video camera.

9. The method set forth in claim 8 including the step of:

viewing a demonstration repair via the user computer and the network server, the demonstration repair corresponding to a repair being performed on the user's vehicle in the service bay.

10. The method set forth in claim 8 including the step of:

viewing a cost estimate via the user computer and the network server, the cost estimate being for a repair to be performed on the user's vehicle.

11. The method set forth in claim 8 including the step of:

making payment for the repair to the user's vehicle via the user computer and the network server.

12. The method set forth in claim 8 including the step of:

obtaining access to the database via the user computer and the network server and entering user and vehicle information related to a service event and receiving a transaction code via the network server and the user computer.

13. The method set forth in claim 8 including the step of:

entering one of a transaction code and a password by the user via the user's computer and the network server to gain access to the database for selectively viewing the user's vehicle via the video camera or determining the service status of the user's vehicle.

\* \* \* \* \*